(12) United States Patent
Fitzgerald

(10) Patent No.: US 12,378,816 B2
(45) Date of Patent: Aug. 5, 2025

(54) UNIVERSAL ADJUSTABLE BRACKET FOR WINDOW AND DOOR COVERINGS

(71) Applicant: Alwood Industries, Richardson, TX (US)

(72) Inventor: Ryan D. Fitzgerald, Doonan (AU)

(73) Assignee: Alwood Industries, Richardson, TX (US)

( * ) Notice: Subject to any disclaimer, the term of this patent is extended or adjusted under 35 U.S.C. 154(b) by 692 days.

(21) Appl. No.: 17/636,543

(22) PCT Filed: Sep. 3, 2020

(86) PCT No.: PCT/US2020/049212
§ 371 (c)(1),
(2) Date: Feb. 18, 2022

(87) PCT Pub. No.: WO2021/046226
PCT Pub. Date: Mar. 11, 2021

(65) Prior Publication Data
US 2022/0298854 A1    Sep. 22, 2022

Related U.S. Application Data

(60) Provisional application No. 62/895,539, filed on Sep. 4, 2019, provisional application No. 62/895,269, filed on Sep. 3, 2019.

(51) Int. Cl.
*E06B 9/42*   (2006.01)
*E06B 9/50*   (2006.01)
(Continued)

(52) U.S. Cl.
CPC ............. *E06B 9/42* (2013.01); *F16M 13/022* (2013.01); *E06B 9/266* (2013.01); *E06B 9/50* (2013.01)

(58) Field of Classification Search
None
See application file for complete search history.

(56) References Cited

U.S. PATENT DOCUMENTS 2,822,043 A * 2/1958 Horak ............... E06B 9/367
 160/172 R
2,957,520 A * 10/1960 Howard .............. E06B 9/302
 160/113
(Continued)

FOREIGN PATENT DOCUMENTS

CN     204476224 U  *  7/2015
DE   202013103954 U1    11/2013
(Continued)

OTHER PUBLICATIONS

International Search Report & Written Opinion of International Application No. PCT/US2020/049212 dated Nov. 12, 2020.
(Continued)

*Primary Examiner* — Phi D A
(74) *Attorney, Agent, or Firm* — Young Basile Hanlon & MacFarlane, P.C.

(57) ABSTRACT

A bracket is disclosed that is configured for engagement with a clip for a window or door covering. The bracket includes a body and an adjustment mechanism that is configured for engagement with the body and the clip such that the clip is supportable by the body and the adjustment mechanism. The adjustment mechanism includes a drive assembly that is configured to vary a height of the bracket and a vertical position of the clip.

12 Claims, 29 Drawing Sheets

(51) Int. Cl.
*F16M 13/02* (2006.01)
*E06B 9/266* (2006.01)

(56) References Cited

U.S. PATENT DOCUMENTS

| | | | | |
|---|---|---|---|---|
| 4,628,981 | A * | 12/1986 | Ciriaci | E06B 9/365 160/176.1 V |
| 5,054,535 | A * | 10/1991 | Rozon | E06B 9/364 160/176.1 V |
| 5,553,820 | A * | 9/1996 | Karten | F16M 13/00 248/181.2 |
| 5,597,026 | A * | 1/1997 | Fuentes | E06B 9/365 160/115 |
| 5,626,177 | A * | 5/1997 | Colson | E06B 9/323 160/168.1 V |
| 5,799,922 | A * | 9/1998 | Timms | B60N 2/502 248/564 |
| 6,360,806 | B1 * | 3/2002 | Bowman | E06B 9/36 160/168.1 V |
| 6,416,027 | B1 * | 7/2002 | Hart | A47B 81/065 312/7.2 |
| 7,134,469 | B2 | 11/2006 | Drew et al. | |
| 8,333,355 | B2 * | 12/2012 | Stifal | F16M 11/2092 248/920 |
| 8,756,873 | B1 * | 6/2014 | Hire | E04F 10/10 49/82.1 |
| 9,635,929 | B1 * | 5/2017 | Wu | A47B 23/043 |
| 12,037,794 | B1 * | 7/2024 | Rayburn | E04B 7/163 |
| 2005/0051688 | A1 * | 3/2005 | Dittmer | F16M 11/38 248/920 |
| 2006/0016946 | A1 * | 1/2006 | Bohlen | E06B 9/323 248/231.9 |
| 2013/0306825 | A1 * | 11/2013 | Brodersen | B60N 2/507 248/419 |
| 2015/0034260 | A1 | 2/2015 | Blair et al. | |
| 2017/0065077 | A1 * | 3/2017 | Behroozi | F16M 11/2014 |
| 2018/0084903 | A1 * | 3/2018 | Liao | A47B 21/02 |
| 2019/0059582 | A1 * | 2/2019 | Trusty | F16M 11/10 |
| 2019/0136615 | A1 * | 5/2019 | Vangberg-Brinkmann | E06B 9/42 |
| 2021/0048144 | A1 * | 2/2021 | Fehr | F16B 2/205 |

FOREIGN PATENT DOCUMENTS

| | | | | |
|---|---|---|---|---|
| EP | 1122398 | B1 | 4/2003 | |
| FR | 2740826 | A1 | 5/1997 | |
| WO | WO-9635855 | A2 * | 11/1996 | E06B 9/262 |

OTHER PUBLICATIONS

International Search Report & Written Opinion for International Application No. PCT/US2020/049210 dated Nov. 12, 2020.

* cited by examiner

UNIVERSAL ADJUSTABLE BRACKET FOR WINDOW AND DOOR COVERINGS

CROSS-REFERENCE TO RELATED APPLICATIONS

This application is a 371 of International Application No. PCT/US2020/049212, filed on Sep. 3, 2020, which claims priority to U.S. Provisional Application No. 62/895,269, filed on Sep. 3, 2019, and U.S. Provisional Application No. 62/895,539, filed on Sep. 4, 2019, the entire disclosures of which are hereby incorporated by reference.

TECHNICAL FIELD

The present disclosure relates to coverings (e.g., shades, blinds, etc.) for windows, doors, and the like and, more specifically, to an adjustable bracket that allows for adjustment in the height (vertical position) of such coverings.

BACKGROUND

Window and door coverings, such as roman shades, roller shades, blinds, etc., are often mounted via brackets that are installed using one or more fasteners (e.g., screws, nails, etc.). In the event that the height (vertical position) of such coverings requires adjustment (e.g., for the purpose of leveling, to eliminate gapping with the jamb(s), sill(s), etc.), the brackets must be removed, relocated, and reinstalled, which can be cumbersome and time consuming.

The present disclosure addresses these issues by providing an adjustable bracket that allows the height of coverings to be varied without necessitating the removal, relocation, and reinstallation typically associated with such adjustments.

SUMMARY

In one aspect of the present disclosure, a bracket is disclosed that is configured for engagement with a clip for a window or door covering. The bracket includes a body including a receipt structure and an adjustment mechanism that is configured for positioning within the receipt structure such that the adjustment mechanism extends between the body and the clip. The adjustment mechanism includes: an upper support defining a pair of channels that extend in (generally) parallel relation to a length of the bracket; a drive member defining a longitudinal axis that is rotatable in relation to the upper support; a first retainer; a leg assembly; and a second retainer.

The first retainer includes lateral extensions that extend into the pair of channels defined by the upper support and is configured to receive the drive member such that rotation of the drive member causes axial translation of the first retainer along the longitudinal axis of the drive member.

The leg assembly includes a first pair of legs with upper and lower ends and a second pair of legs with upper and lower ends that is pivotably connected to the first pair of legs. The upper ends of the first pair of legs are connected to the first retainer such that the axial translation of the first retainer causes corresponding axial translation of the upper ends of the first pair of legs, and the lower ends of the first pair of legs and the second pair of legs are each mechanically connected to the clip.

The second retainer is connected to the upper ends of the second pair of legs and is fixedly connected to the upper support such that axial translation of the upper ends of the first pair of legs causes the leg assembly to pivot to thereby vary a vertical position of the clip.

In certain embodiments, the drive member may include a worm gear having a helical thread. In certain embodiments, the bracket may further include a first anchor that extends through the upper support and into engagement with the second retainer to fixedly connect the second retainer and the upper ends of the second pair of legs to the upper support. In certain embodiments, the bracket may further include a third retainer that is connected to the lower ends of the first pair of legs and a fourth retainer that is connected to the lower ends of the second pair of legs and configured for movable engagement with the clip. In certain embodiments the bracket may further include a second anchor that extends through the third retainer. In certain embodiments, the second anchor may be configured for engagement with the clip to fixedly connect the third retainer and the lower ends of the first pair of legs to the clip. It is envisioned that the bracket described above may include any combination of features and elements described in this paragraph.

In another aspect of the present disclosure, a bracket is disclosed that is configured for engagement with a clip for a window or door covering. The bracket includes a body and an adjustment mechanism that is configured for engagement with the body and the clip such that the clip is supportable by the body and the adjustment mechanism. The adjustment mechanism includes a drive assembly that is configured to vary a vertical position of the clip.

In certain embodiments, the adjustment mechanism may include an upper support and a leg assembly that extends between the upper support and the clip. In certain embodiments, the leg assembly may include a first pair of legs and a second pair of legs that is pivotably connected to the first pair of legs. In certain embodiments, each of the first pair of legs and the second pair of legs may each have an upper end that is positioned adjacent to the upper support and a lower end that is positioned adjacent to the clip. In certain embodiments, the upper ends of the first pair of legs may be movable in relation to the upper support and the upper ends of the second pair of legs may be fixed in relation to the upper support. In certain embodiments, the upper ends of the first pair of legs may be mechanically connected to the drive assembly such that activation of the drive assembly causes axial translation of the upper ends of the first pair of legs in relation to the upper ends of the second pair of legs to pivot the leg assembly and thereby vary the vertical position of the clip. In certain embodiments, the drive assembly may include a first retainer that is configured for engagement with the upper ends of the first pair of legs and a drive member that is configured for rotatable engagement with the first retainer such that rotation of the drive member causes axial translation of the first retainer along a longitudinal axis of the drive member. In certain embodiments, the first retainer may include lateral extensions that are configured for insertion into corresponding openings defined by the upper ends of the first pair of legs. In certain embodiments, the drive member may include a worm gear having a helical thread. In certain embodiments, the drive assembly may further include a second retainer that is configured for engagement with the upper ends of the second pair of legs. In certain embodiments, the second retainer may include lateral extensions that are configured for insertion into corresponding openings defined by the upper ends of the second pair of legs. In certain embodiments, the second retainer may include a through hole that is configured to receive the drive member such that the drive member is rotatable in relation to the second retainer. In certain embodiments, the bracket may further include an anchor that extends through the upper support and into engagement with the second retainer to fixedly connect the second retainer and the upper ends of the second pair of legs to the upper support. It is envisioned that the bracket described above may include any combination of features and elements described in this paragraph.

In another aspect of the disclosure, a method is disclosed for adjusting a vertical position of a window or door covering. The method includes connecting a clip supporting an end of the window or door covering to an adjustment mechanism of a bracket and operating a drive assembly of the adjustment mechanism to vary a vertical position of the clip.

In certain embodiments, connecting the clip to the adjustment mechanism may include connecting the clip to a pivotable leg assembly. In certain embodiments, operating the drive assembly may include rotating a drive member to cause axial translation of a retainer connected to the pivotable leg assembly to thereby reconfigure the pivotable leg assembly and vary the vertical position of the clip. It is envisioned that the method described above may include any combination of features, elements, and/or tasks described in this paragraph.

BRIEF DESCRIPTION OF THE DRAWINGS

According to common practice, the various features of the drawings may not be to scale, and may be arbitrarily expanded or reduced for clarity.

DETAILED DESCRIPTION

Figure 1:
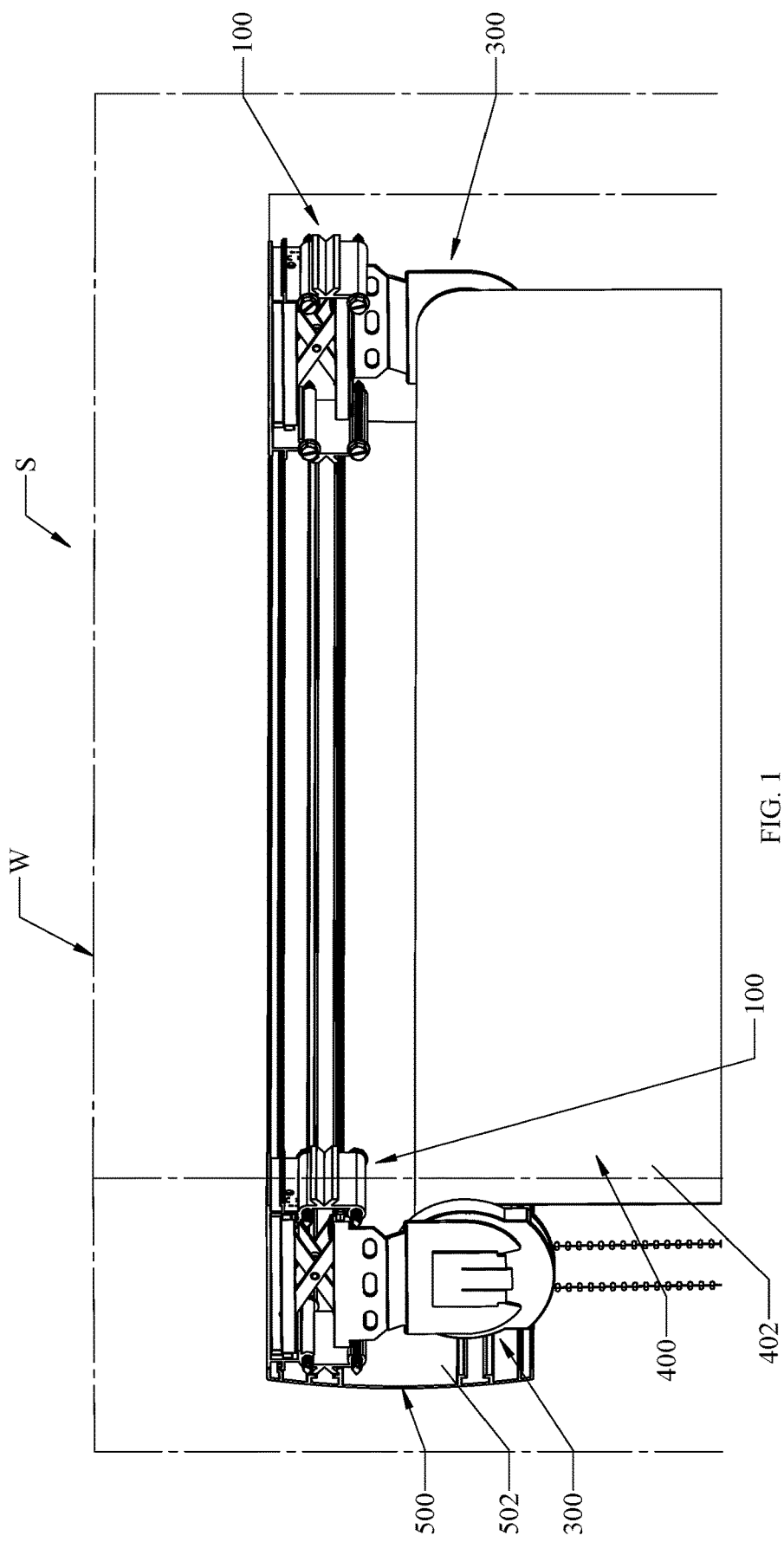
FIG. 1 is a front, perspective view of a bracket according to the principles of the present disclosure shown supporting a clip, a covering (e.g., a shade, blinds, etc.) for a window or a door, and a decorative element.
Figure 2:
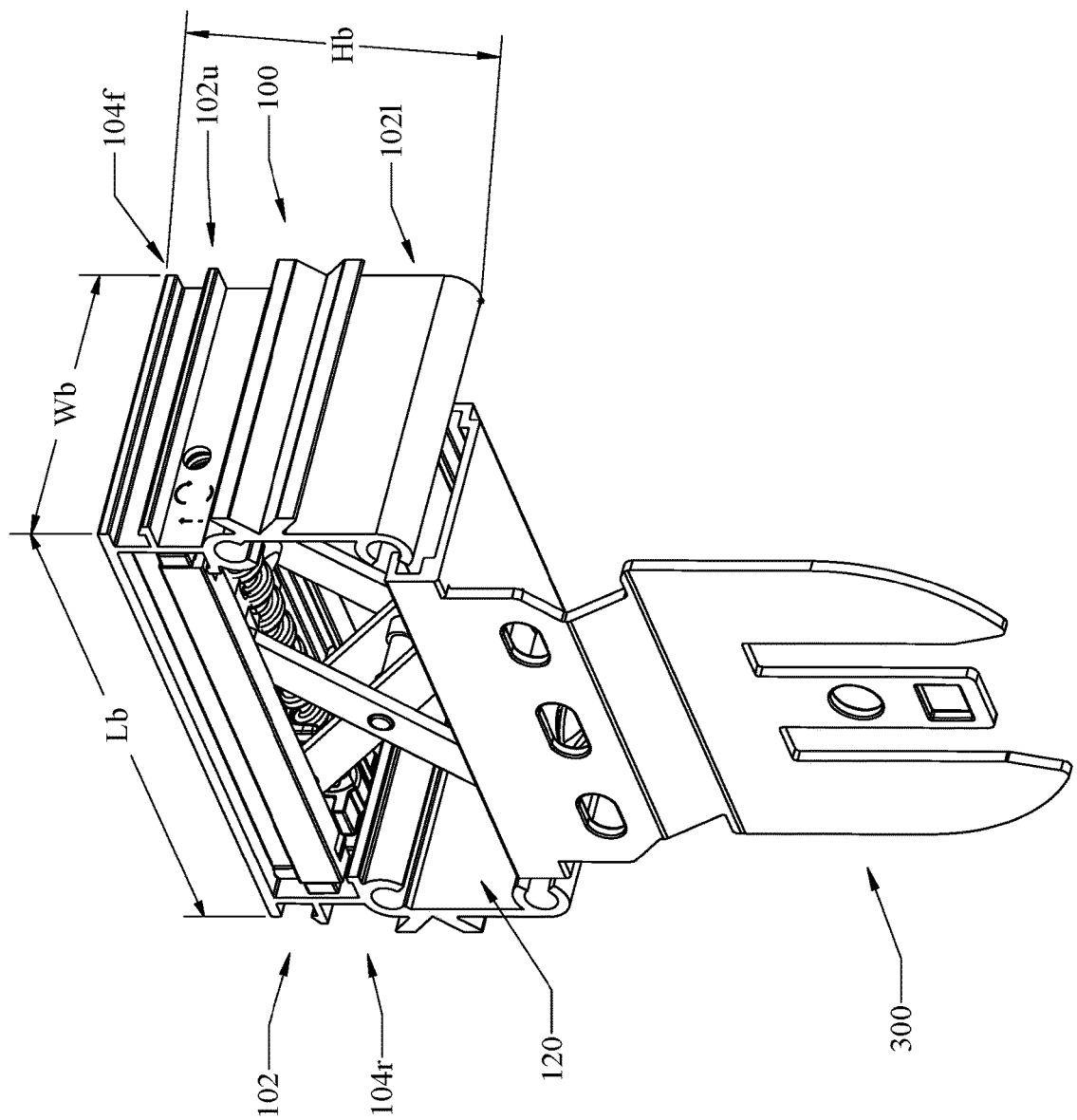
FIG. 2 is a rear, perspective view of the bracket and the clip.
Figure 3A:
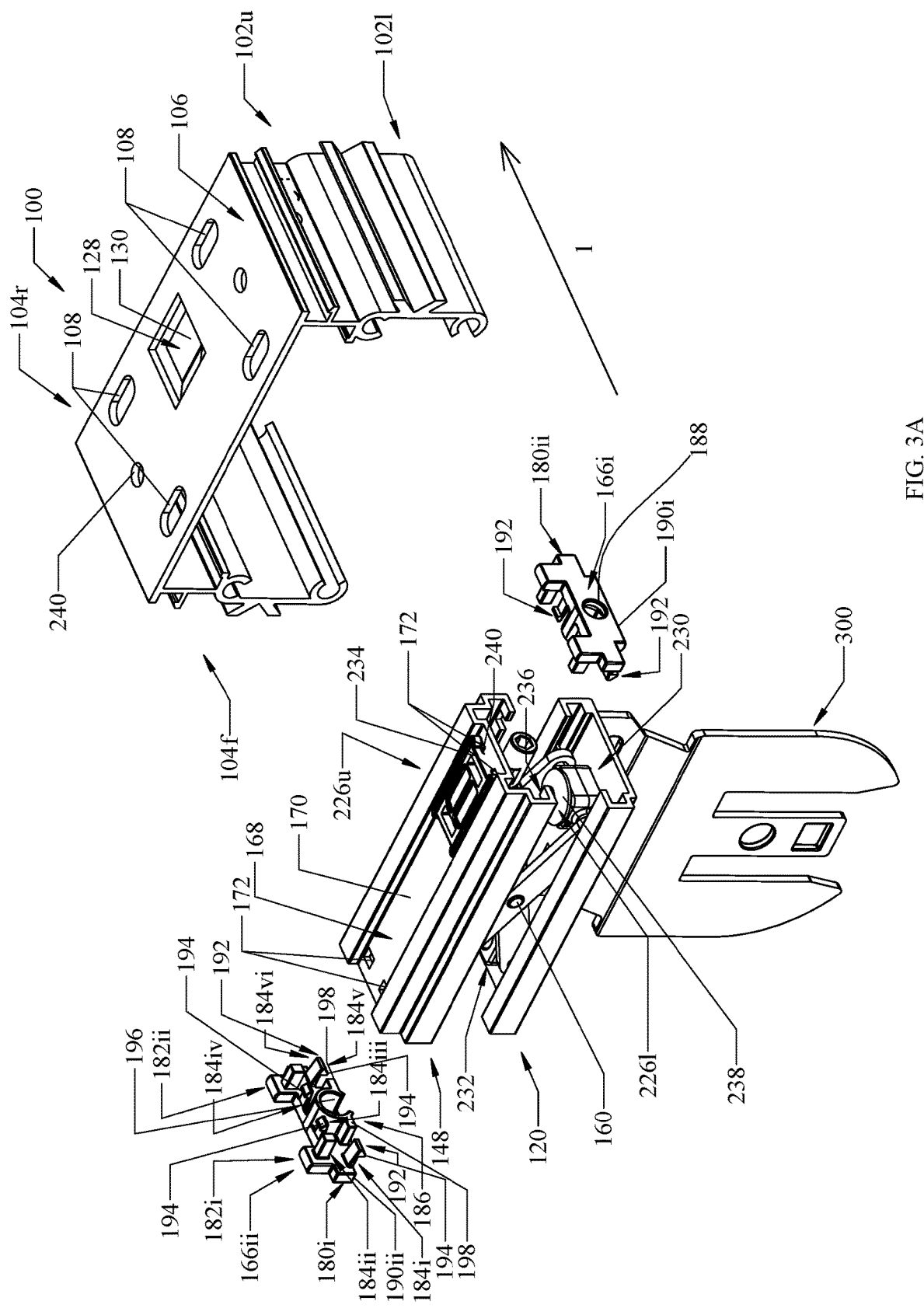
FIG. 3A is a rear, perspective view of the bracket and the clip with an adjustment mechanism of the bracket shown separated from a body of the bracket.
Figure 3B:
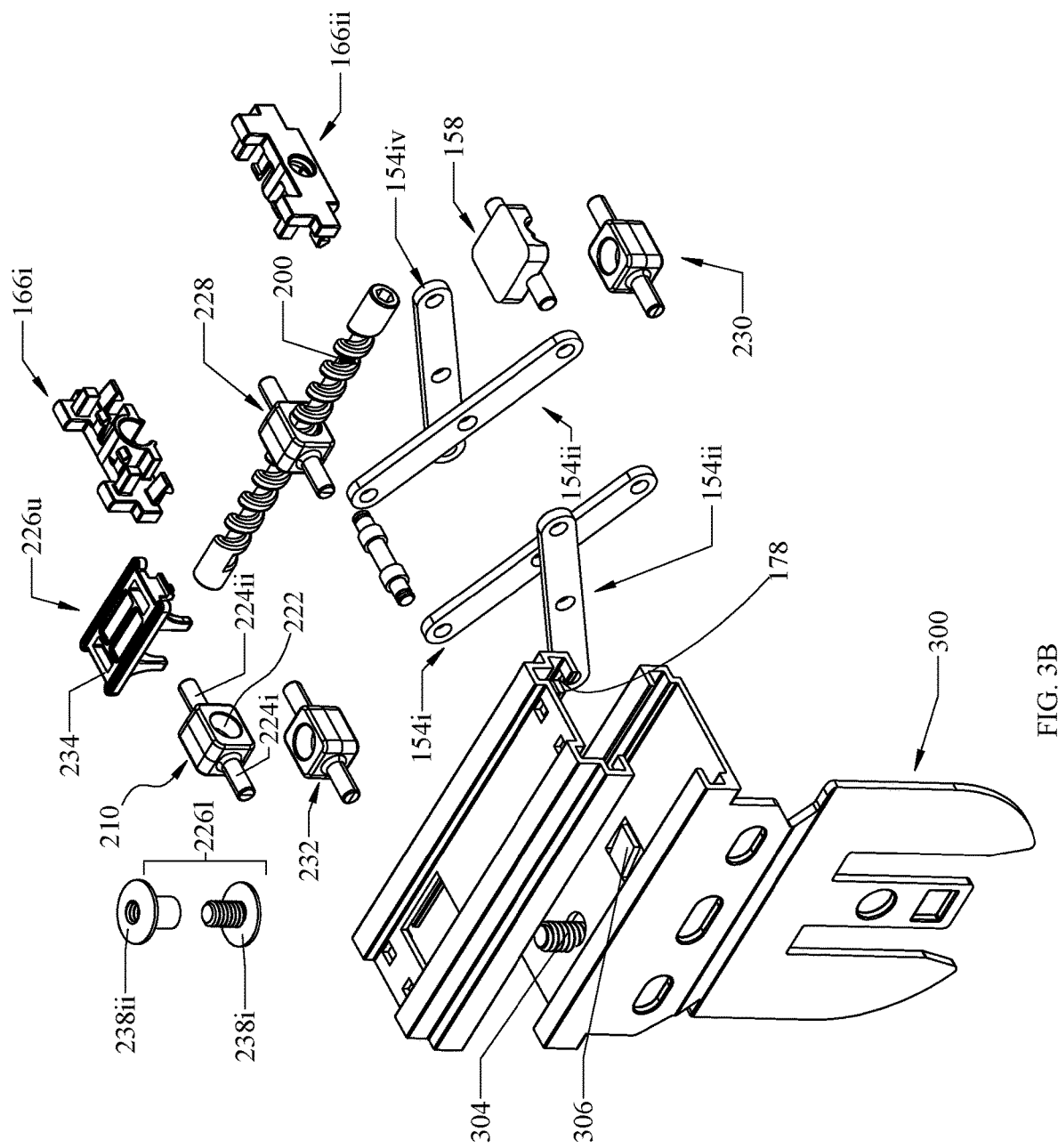
FIG. 3B is a rear, perspective view of the clip and the adjustment mechanism shown with parts separated.
Figure 3C:
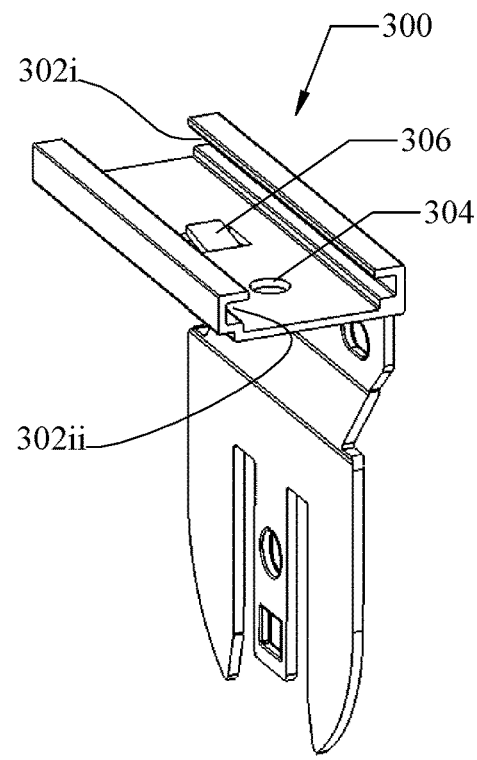
FIG. 3C is a top, front, perspective view of the clip.
Figure 3D:
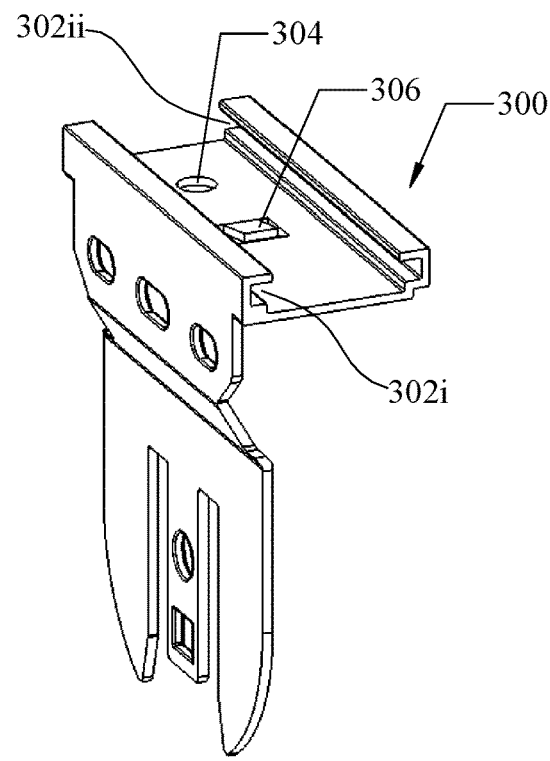
FIG. 3D is a top, rear, perspective view of the clip.
Figure 3E:
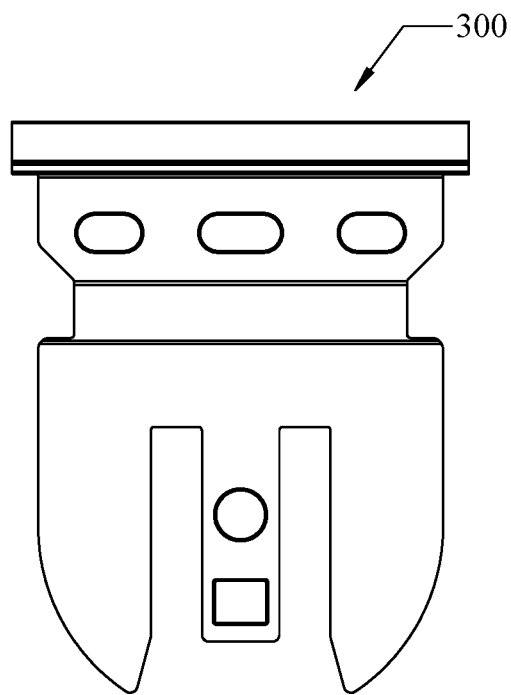
FIG. 3E is a front, plan view of the clip.
Figure 3F:
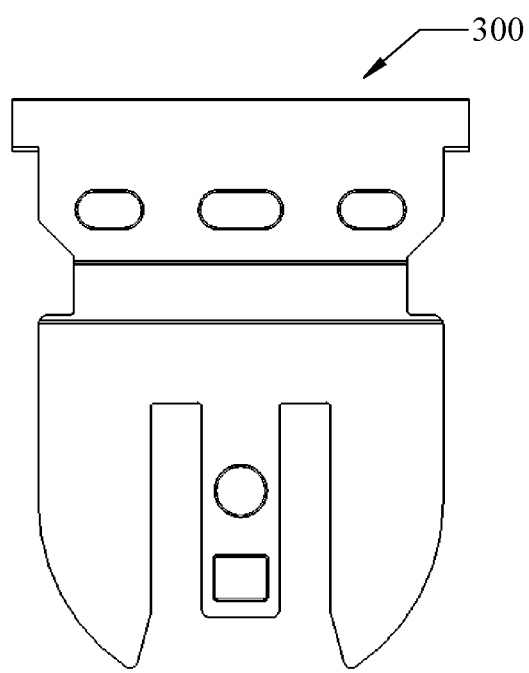
FIG. 3F is a rear, plan view of the clip.
Figure 3G:
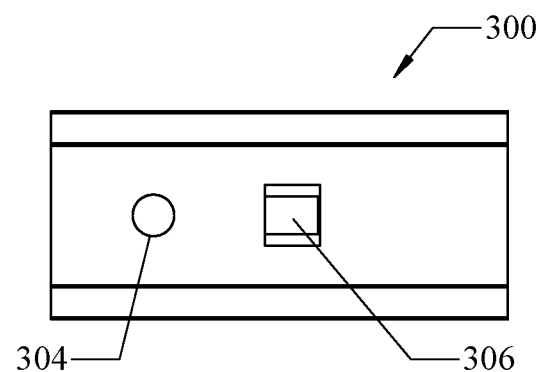
FIG. 3G is a top, plan view of the clip.
Figure 3H:
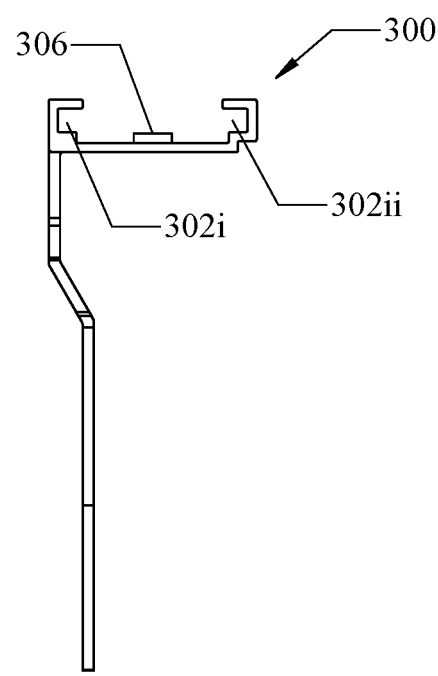
FIG. 3H is a side, plan view of the clip.

The present disclosure describes brackets that are configured for use with coverings for windows, doors, etc., including, for example, roman shades, roller shades, blinds, etc. Typically, such coverings include (or are connectable to) a clip, connector, or the like, which allows for attachment of the covering to a specific bracket (or other such support) that is secured in place on a mounting surface (e.g., adjacent to the window, the door, etc., to be covered). Known brackets, however, are often configured for use with a particular clip, and must be removed, relocated, and reinstalled to vary the height (vertical position) of the covering being supported.

The presently disclosed brackets, by contrast, are universal, in that they may be configured for use with a variety of coverings (and a variety of corresponding clips). Additionally, the brackets described herein allow for adjustment in the height (vertical position) of a covering, which facilitates and simplifies leveling and allows the covering to be positioned as necessary or desired to conceal, obscure, or otherwise eliminate gapping between the covering and the window, the door, the jamb(s), the sill(s), etc. As described in detail herein below, the configuration of the presently disclosed brackets eliminate the need for removal, relocation, and reinstallation typically associated with such adjustments.

Although (generally) described herein in the context of windows and roller shades, it should be appreciated that the presently disclosed brackets may be utilized in a variety of locations (e.g., on a door), and may be configured to support a variety of coverings (e.g., roman shades, blinds, etc.). For example, in one implementation, it is envisioned that the presently disclosed brackets may be used to mount a covering over door glass (e.g., in a French door).

The presently disclosed brackets are also configured to support a decorative element (e.g., fascia), which allows for further customization in the appearance of the window, the door, etc., with which the covering is associated, and supports use with an assortment of coverings during a variety of installations including, for example, a face-mounted installation; an inside, side-mounted installation; and an inside, top mounted installation. As described below, in a face-mounted installation, the brackets are secured to (or adjacent to) an outer (end) face of the mounting surface (e.g., the window, the door, etc., to be covered), whereas in inside-mounted installations, the brackets are secured to inner (side) or top (upper) faces of the mounting surface (e.g., adjacent to the jamb of a door, the jamb or frame of a window, etc.).

FIGS. 1-11I illustrate a bracket 100 according to the principles of the present disclosure that is removably connectable to a mounting surface S (FIG. 1) (e.g., a window W, a wall supporting the window W, a jamb of the window W, a door, etc.). The bracket 100 is configured for releasable connection to (removable engagement with) a clip 300, which supports a covering 400 for the window W (e.g., a roller window shade 402), as well as one or more decorative elements 500 (e.g., fascia 502), which enhance the overall aesthetic appearance and/or functionality of the window W, the door, etc. The bracket 100 may include (e.g., may be formed partially or entirely from) any suitable material or combination of materials, including, for example, plastics, polymers, metallic materials, etc., and may be formed using any suitable method of manufacture, including, for example, 3-D printing, extrusion, casting, etc. In certain embodiments, it is envisioned that the material(s) from which the bracket 100 is formed may include resilient properties to allow for deflection during installation in the manner described herein below.

The bracket 100 includes a body 102 having upper and lower body portions 102u, 102l (FIG. 2), and defines opposing front and rear portions 104f, 104r, respectively, as well as: a (horizontal) length Lb; a width Wb; and a (vertical) height Hb. In the illustrated embodiment, the body 102 of the bracket 100 is symmetrical about a vertical axis (e.g., a central plane P (FIG. 5)), and is shown as being integrally (e.g., monolithically) formed. It should be appreciated, however, that one or more components of the body 102 may be formed separately, and connected to the body portions 102u, 102l in any suitable manner, as described in further detail below.

Figure 4:
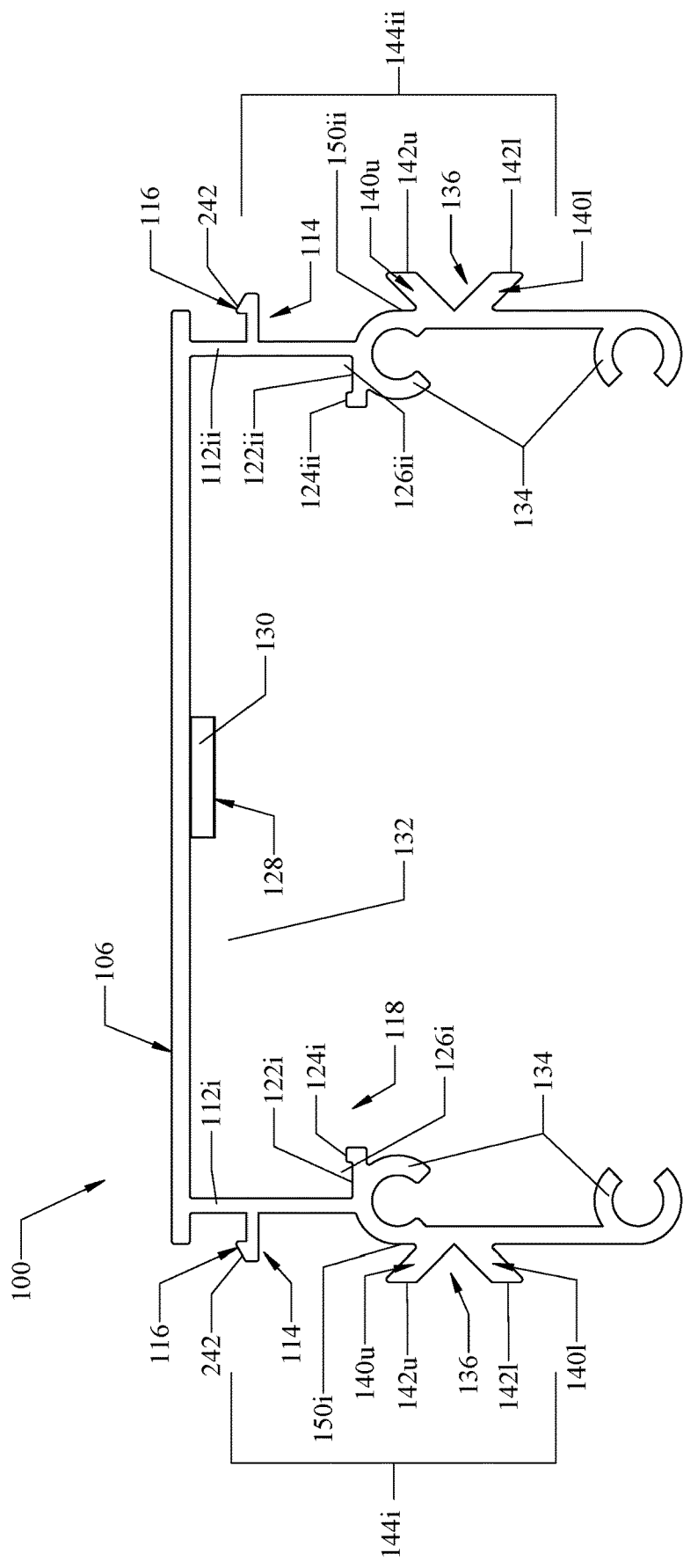
FIG. 4 is a front, plan view of the body of the bracket.
Figure 5A:
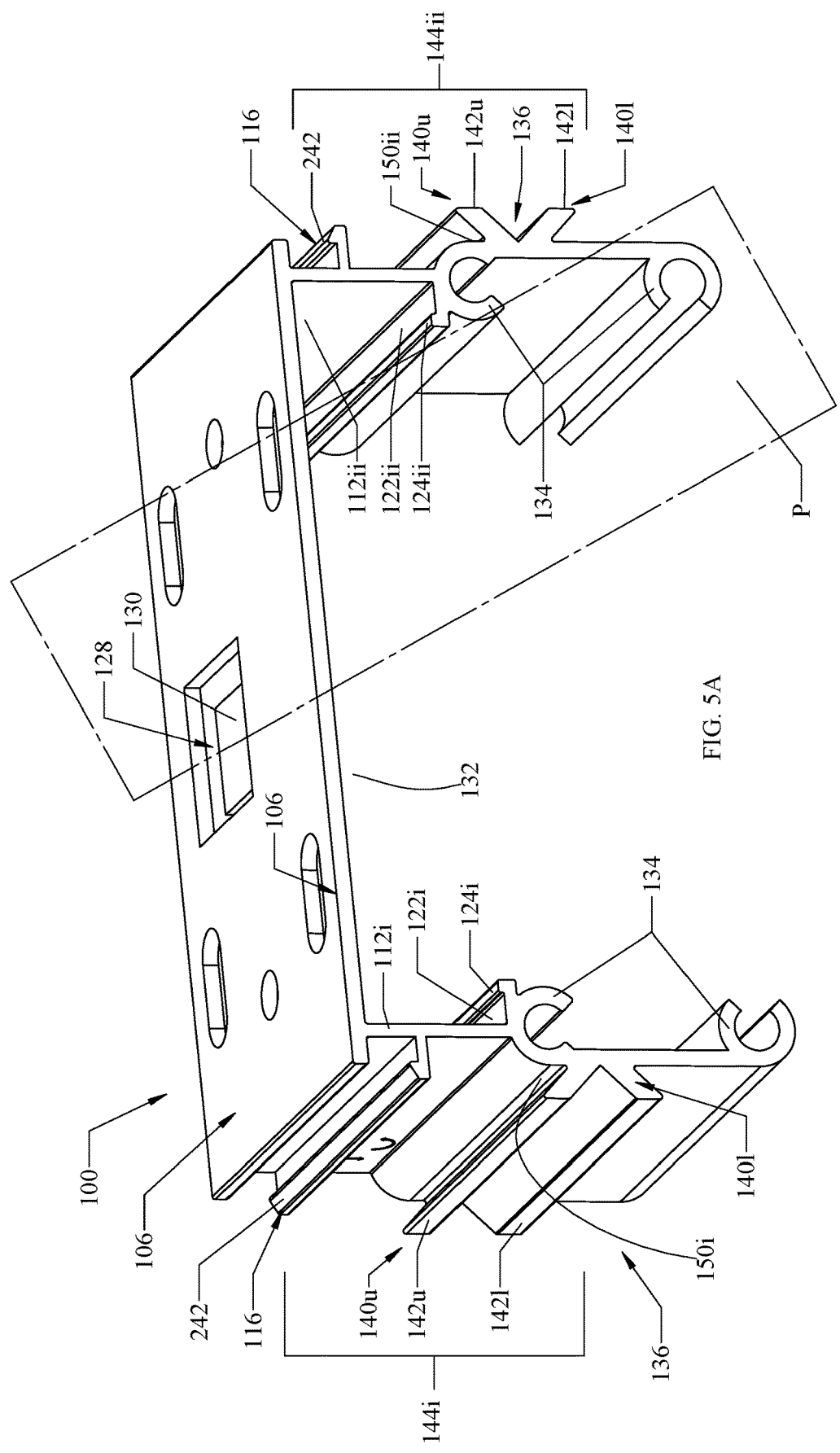
FIG. 5A is a top, perspective view of the body of the bracket.
Figure 5B:
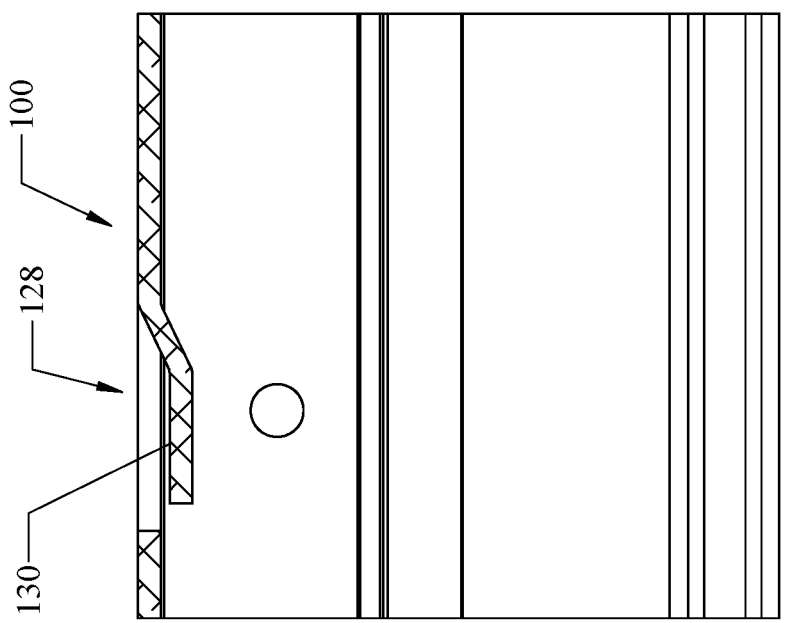
FIG. 5B is a partial, vertical, cross-sectional view of the bracket illustrating a stop configured for engagement with the adjustment mechanism.

The upper body portion 102u defines an upper wall 106 with one or more through holes 108 (FIG. 3) that are configured to receive fasteners 110 (FIG. 11A) (e.g., screws, nails, etc.) during an inside, top-mounted installation, as described in further detail below. The upper body portion 102u includes a pair of side walls 112i, 112ii each supporting an arm 114 (FIG. 4) defining a tooth 116; and a receipt structure 118 that is configured to removably receive an adjustment mechanism 120 of the bracket 100 that is configured for connection to (engagement with) the clip 300 in the manner described herein below. As seen in FIG. 4, for example, in certain embodiments, the upper wall 106 may extend outwardly of the side walls 112i, 112ii (i.e., along the length Lb of the bracket 100).

The receipt structure 118 includes a pair of lower walls 122i, 122ii (FIG. 4) defining upstanding (vertical) ribs 124i, 124ii, respectively. Together with the side walls 112i, 112ii, the lower walls 122i, 122ii defines a pair of channels 126i, 126ii that receive and support the adjustment mechanism 120, as described in further detail below, such that the adjustment mechanism 120 is connectable to and disconnectable from the body 102 of the bracket 100 via insertion into and removal from the receipt structure 118. When positioned within the receipt structure 118, the adjustment mechanism 120 extends between the body 102 of the bracket 100 and the clip 300 (FIGS. 2, 3) such that the clip 300 is supportable by the body 102 and the adjustment mechanism 120.

In certain embodiments, such as that shown throughout the figures, the bracket 100 includes a stop 128 (FIGS. 3, 4) (e.g., a deflectable tab 130) that extends vertically downward from the upper wall 106 along the height Hb of the bracket 100. The stop 128 is configured for engagement with the adjustment mechanism 120 to secure the adjustment mechanism 120 and, thus, the clip 300, in relation to the bracket 100, as described in further detail below. Additionally, it is envisioned that the stop 128 may be configured to contact the adjustment mechanism 120 to inhibit (if not entirely prevent) the adjustment mechanism 120 and, thus, the clip 300, from exiting the rear portion 104r of the bracket 100 in the direction of insertion identified by the arrow 1 (FIG. 3).

The side walls 112i, 112ii are separated (horizontally) so as to define a receiving space 132 (FIG. 4) for the adjustment mechanism 120. It should be appreciated that the dimensions and positions of the side walls 112i, 112ii may be varied in alternate embodiments of the disclosure as necessary or desired.

The lower body portion 102l includes a plurality of receptacles 134 (FIG. 4), and engagement members 136. The receptacles 134 are supported by (e.g., are formed integrally with) the inner wall 112i and are configured to receive fasteners 138 (FIG. 15) (e.g., screws, nails, etc.) to facilitate securement (connection) of the bracket 100 to the mounting surface S during an inside, side-mounted installation, as described in further detail below. More specifically, the receptacles 134 extend in (generally) parallel relation to the width Wb of the bracket 100. Although shown as including four receptacles 134 (and four corresponding fasteners 138), it should be appreciated that the number of receptacles 134 and the number of fasteners 138 may be increased or decreased in alternate embodiments without departing from the scope of the present disclosure.

The engagement members 136 facilitate connection of the bracket 100 to not only the decorative element 500 (e.g., the fascia 502), but to a support member 600 (FIG. 12) (e.g., a clasp 602) during a face-mounted installation, as described in further detail below. As seen in FIG. 4, each engagement member 136 is (generally) V-shaped in configuration, and includes an upper strut 140*u* defining an outer contact surface 142*u* and a lower strut 140*l* defining an outer contact surface 142*l*.

Figure 12:
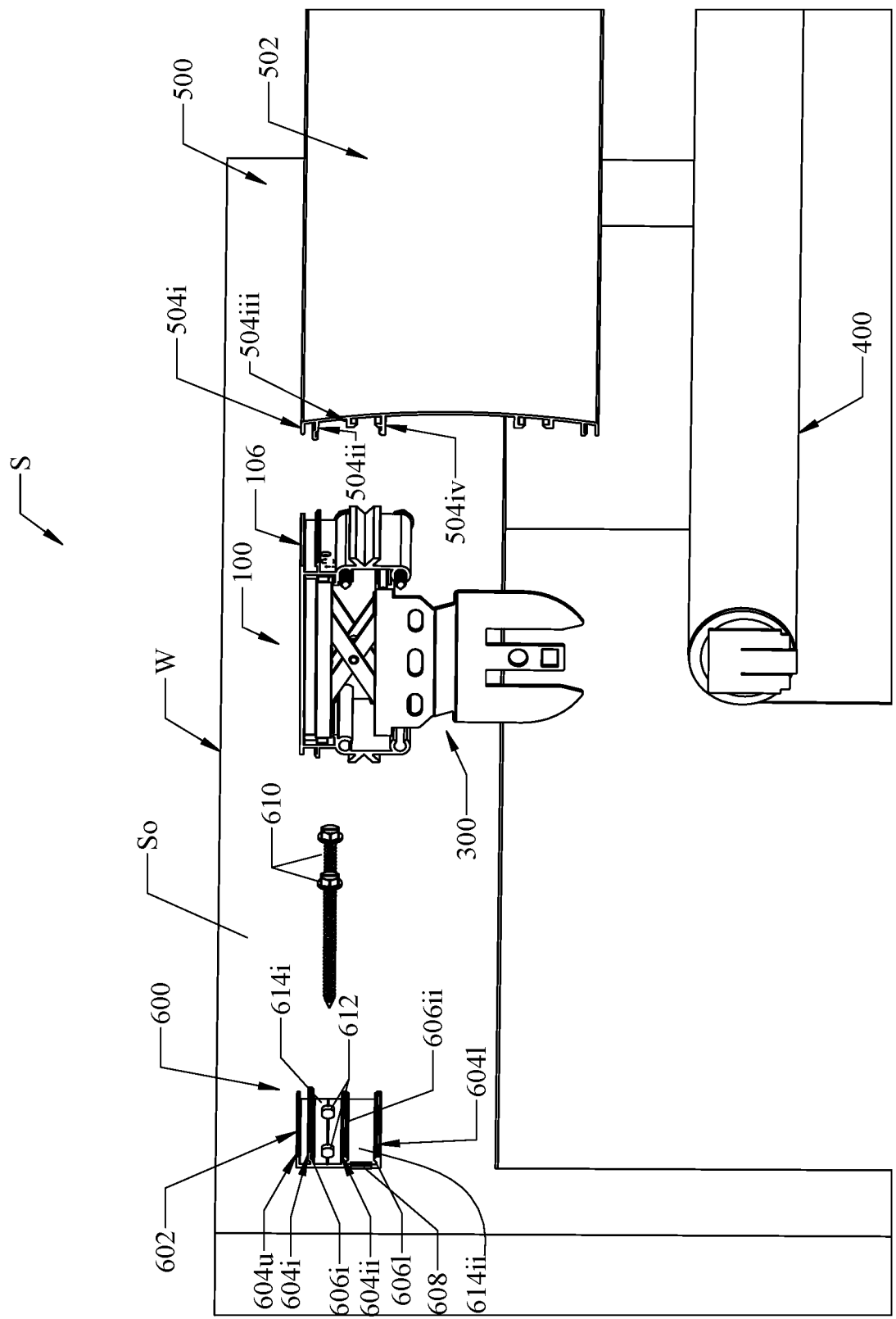
FIG. 12 is a side, perspective view illustrating a faced-mounted installation of the bracket, the clip, the covering, and the decorative element to the mounting surface.

Together with the arms 114, the engagement members 136 define (first and second) mounting structures 144*i*, 144*ii*. The mounting structures 144*i*, 144*ii* are supported on (e.g., are formed integrally with) opposite (first and second) outer surfaces (sides) 146*i*, 146*ii* of the bracket 100, respectively, whereby the mounting structures 144*i*, 144*ii* extend in (generally) opposite directions. As described in further detail below, the mounting structures 144*i*, 144*ii* facilitate connection of the bracket 100 to not only the decorative element 500 (e.g., the fascia 502), but to the support member 600 (FIG. 12).

With particular reference to FIGS. 3, 10, 11A, and 11B, the adjustment mechanism 120 will be discussed, which is removably receivable by (engageable with) the body 102 of the bracket 100 (e.g., via the receipt structure 118). The adjustment mechanism 120 is configured to vary the vertical position (height) of the clip 300 relative to the bracket 100, as described in further detail below, and includes an upper support 148; a drive assembly 150 that is accommodated within the upper support 148; and a (pivotable) leg assembly 152 that extends between the upper support 148 and the clip 300 and includes a (first) pair legs 154*i*, 154*ii* having respective upper ends 156*i*, 156*ii* and lower ends 158*i*, 158*ii* and a (second) pair of legs 154*iii*, 154*iv* having respective upper ends 156*iii*, 156*iv* and lower ends 158*iii*, 158*iv* that are connected to the pair legs 154*i*, 154*ii* by a pivot member 160 (e.g., a pin 162), which allows the legs 154*i*-154*iv* to pivot in relation to each other during reconfiguration of the leg assembly 152, as described in further detail below.

The upper support 148 is configured for receipt within the receiving space 132. More specifically, the upper support 148 includes a body 164 and a pair of end caps 166*i*, 166*ii* that are configured for connection to the body 164.

The body 164 includes a recess 168 that extends along the length Lb of the bracket 100. The recess 168 defines a floor 170 that includes a series of apertures 172 and is configured to receive the stop 128 (e.g., in an interference fit) to facilitate proper connection and orientation of the adjustment mechanism 120 and the body 102 of the bracket 100. The body 164 further includes (defines) as a pair of outer (first) channels 174*i*, 174*ii* and a pair of inner (second) channels 176*i*, 176*ii*, each of which extends in (generally) parallel relation to the length Lb of the bracket 100. The outer channels 174 defines a series of apertures 178 (FIG. 3B) and are configured to receive and support the end caps 166 as well and the respective upper ends 156*i*-156*iv* of the legs 154*i*-154*iv* such that the respective upper ends 156*i*-156*iv* of the legs 154*i*-154*iv* are positioned (generally) adjacent to the upper support 148, as described in further detail below. More specifically, each of the outer channels 174*i*, 174*ii* includes an aperture 178 at the opposing ends thereof that is positioned adjacent to the end caps 166*i*, 166*ii*. The inner channels 176 are positioned laterally inward of the outer channels 174 (e.g., along the width Wb of the bracket 100) and vertically above the outer channels 174 (e.g., further from the clip 300). As described in further detail below, the inner channels 176 are also configured to receive and support the end caps 166 to facilitate connection and disconnection of the end caps 166 to the body 164 of the upper support 148.

The end caps 166*i*, 166*ii* are identical in configuration and each include a pair of lateral extensions 180*i*, 180*ii* (FIG. 3A); a pair of vertical extensions 182*i*, 182*ii*; arms 184*i*-184*vi*; a brace 186; a through hole 188; and a lower flange 190.

The lateral extensions 180*i*, 180*ii* support the arms 184*i*, 184*ii*, each of which is configured as a deflectable clip 192 that includes an angled (chamfered) finger 194. The angled fingers 194 are configured for removable insertion into a corresponding aperture 178 in the outer channels 174 to facilitate connection and disconnection of the end caps 166 to the body 164 of the upper support 148.

The vertical extensions 182*i*, 182*ii* are positioned laterally inward of the lateral extensions 180*i*, 180*ii* (e.g., along the width Wb of the bracket 100) and support the arms 184*iii*, 184*iv*. The arms 184*iii*, 184*iv* are configured for insertion into the respective inner channels 176*i*, 176*ii* defined by the body 164 of the upper support 148 and, thus, act as locating features that facilitate proper alignment and connection of the end caps 166 and the body 164.

The arms 184*v*, 184*vi* are positioned laterally inward of the vertical extensions 182*i*, 182*ii* (e.g., along the width Wb of the bracket 100) in (generally) adjacent relation to the brace 186. Similar to the arms 184*i*, 184*ii*, each of the arms 184*v*, 184*vi* is configured as a deflectable clip 192 that includes an angled (chamfered) finger 194. The angled fingers 194 are configured for removable insertion into a corresponding aperture 172 in the floor 170 defined by the recess 168 to further facilitate connection and disconnection of the end caps 166 to the body 164 of the upper support 148.

The brace 186 is generally arcuate in configuration and extend inwardly (e.g., along the length Lb of the bracket 100 towards the brace 186 on the opposing end cap 166) so as to define an interior chamber 196. The interior chamber 196 is in communication with the through hole 188, which allows the drive assembly 150 to be accessed externally via a tool T (FIG. 9), such as an Allen key, a screwdriver, etc., to facilitate activation and operation of the adjustment mechanism 120 in the manner described herein below. In certain embodiments, such as that shown throughout the figures, the brace 186 further includes a pair of feet 198 that extend inward (e.g., along the length Lb of the bracket 100 towards the feet 198 on the opposing end cap 166) to increase structural rigidity and strength of the upper support 148.

The lower flanges 190 on the end caps 166 are configured for positioning within the channels 126 defined by the upper body portion 102*u* of the body 102 of the bracket 100. The lower flanges 190 thus facilitate and support slidable movement of the adjustment mechanism 120 in relation to the bracket 100 during assembly and disassembly of the bracket 100. 226*u*

The drive assembly 150 is configured to translate a rotational force applied to the drive assembly 150 into vertical movement of the adjustment mechanism 120 to allow for variation in the vertical position of the clip 300. In the particular embodiment of the disclosure shown throughout the figures, the drive assembly 150 includes a drive member 200 that defines a longitudinal axis X and is rotatable in relation to the upper support 148, the leg assembly 152 (e.g., the legs 154*i*-154*iv*), and the end caps 166. In the particular embodiment of the disclosure shown throughout the figures, the drive member 200 is configured as a worm gear 202 that includes a rod 204 with a helical thread 206. It should be appreciated, however, that the particular configuration of the drive assembly 150 (e.g., the drive member 200) may be varied in alternate embodiments without departing from the scope of the present disclosure.

The drive member 200 is supported within the upper support 148 by (first and second) retainers 208, 210 of the drive assembly 150. More specifically, the drive member 200 extends through the retainers 208, 210 into the chambers 196 defined by the braces 186 of the end caps 166 such that the drive member 200 is rotatable in relation to the retainers 208, 210 and the end caps 166. retainer 228

The retainer 208 is configured to receive the drive member 200 such that the drive member 200 is rotatably engageable with the retainer 208, and includes (defines) an arcuate channel 212 and includes a pair of identical lateral extensions 214i, 214ii. More specifically, the drive member 200 extends through the channel 212, which includes a projection 216 (e.g., an arcuate tooth 218) that is configured for mating engagement with the drive member 200 (e.g., the helical thread 206) such that rotation of the drive member 200 causes movement of the projection 216 through the helical thread 206, which causes axial translation of the retainer 208 along the length Lb of the bracket 100 and the longitudinal axis X of the drive member 200.

The lateral extensions 214i, 214ii are configured for receipt within corresponding openings 220 defined in the respective upper ends 156i, 156ii of the legs 154i, 154ii such that the legs 154i, 154ii are mechanically connected to (engaged with) the retainer 208 and, thus, the drive assembly 150 (e.g., the drive member 200). More specifically, the lateral extensions 214i, 214ii extend through the openings 220 in the respective upper ends 156i, 156ii of the legs 154i, 154ii and into the outer channels 174i, 174ii defined by the body 164 of the upper support 148, whereby axial translation of the retainer 208 causes concomitant and corresponding axial translation of the respective upper ends 156i, 156ii of the legs 154i, 154ii.

The retainer 210 includes a through hole 222 that receives the drive member 200 such that the drive member 200 extends through the retainer 208, as well as a pair of identical lateral extensions 224i, 224ii. The through hole 222 is configured to receive the drive member 200 such that the drive member 200 is rotatable in within the through hole 222. In contrast to the retainer 208, the retainer 210 is devoid of any mechanical engagement with the drive member 200 which allows the retainer 210 to remain axially stationary during rotation of the drive member 200.

The lateral extensions 224i, 224ii are configured for receipt within corresponding openings 220 defined in the respective upper ends 156iii, 156iv of the legs 154iii, 154iv such that the legs 154iii, 154iv are mechanically connected to drive member 200 via the retainer 208. More specifically, the lateral extensions 224i, 224ii extend through the openings 220 in the respective upper ends 156iii, 156iv of the legs 154iii, 154iv and into the outer channels 174i, 174ii defined by the body 164 of the upper support 148.

The retainer 210 is fixedly (e.g., non-movably) connected to the upper support 148 by an anchor 226u that extends through the upper support 148 and into engagement with the retainer 210. The anchor 226u fixes the axial positions of the retainer 210 and the respective upper ends 156iii, 156iv of the legs 154iii, 154iv along the length Lb of the bracket 100 in relation to the upper support 148. As described in further detail below, fixing the axial positions of the retainer 210 and the respective upper ends 156iii, 156iv of the legs 154iii, 154iv facilitates reconfiguration of the leg assembly 152 to raise and lower the clip 300 and, thus, the covering 400. More specifically, the leg assembly 152 is reconfigurable between: a collapsed configuration (FIG. 6), in which the clip 300 is in an uppermost (highest) vertical position; an expanded configuration (FIG. 8), in which the clip 300 is in an lowermost vertical position; and a series of intermediate configurations positions (FIG. 7), in which the clip 300 is in intermediate vertical positions between the uppermost vertical position and the lowermost vertical position.

In certain embodiments, such as that shown throughout the figures, the bracket 100 further includes an optional (third) retainer 228, which is positioned between the retainers 208, 210 and is configured to support the drive member 200. The retainer 228 is free from mechanical engagement with (connection to) the leg assembly 152 (e.g., the legs 154i-154iv) and is identical in configuration to the retainer 210. As such, the retainer 228 includes the aforementioned through hole 222 and lateral extensions 224i, 224ii, which extend into the outer channels 174i, 174ii defined by the body 164 of the upper support 148. As discussed in connection with the retainer 210, the through hole 174 receives the drive member 200 such that the drive member 200 extends through the retainer 228 and is rotatable within the through hole 222, whereby the retainer 228 is devoid of any mechanical engagement with (connection to) the drive member 200 so as to allow the retainer 228 to remain axially stationary during rotation of the drive member 200.

The bracket 100 further includes a (fourth) retainer 230 that is connected to the respective lower ends 158iii, 158iv of the legs 154iii, 154iv and a (fifth) retainer 232 that is connected to respective lower ends 158i, 158ii of the legs 154i, 154ii.

The retainer 230 is configured for movable engagement with the clip 300 and is identical to the retainers 210, 228. As such, the retainer 230 includes the aforementioned through hole 222 and lateral extensions 224i, 224ii. The retainer 230, however, is rotated 90° (relative to the retainers 210, 228) such that the through hole 222 is oriented vertically (i.e., along the height Hb of the bracket 100 and the direction of movement of the adjustment mechanism 120). The lateral extensions 224i, 224ii are configured for receipt within corresponding openings 220 defined in the respective lower ends 158iii, 158iv of the legs 154iii, 154iv and extend into channels 302i, 302ii defined by the clip 300 such that the respective lower ends 158iii, 158iv of the legs 154iii, 154iv are positioned (generally) adjacent to, and are mechanically engaged with (connected to), the clip 300 via the retainer 230. More specifically, the lateral extensions 224i, 224ii of the retainer 230 are configured for receipt by the channels 302i, 302ii such that the lateral extensions 224i, 224ii are movable through the channels 302i, 302ii during pivoting of the leg assembly 152, as described in further detail below.

The retainer 232 is connected to the respective lower ends 158i, 158ii of the legs 154i, 154ii and is identical to the retainers 210, 228, 230. As such, the retainer 232 the aforementioned through hole 222 and lateral extensions 224i, 224ii, which are configured for receipt within corresponding openings 220 defined in the respective lower ends 158i, 158ii of the legs 154i, 154ii. The lateral extensions 188i, 188ii of the retainer 232 extend into the channels 302i, 302ii defined by the clip 300 such that the respective lower ends 158i, 158ii of the legs 154i, 154ii are positioned (generally) adjacent to, and are mechanically engaged with (connected to), the clip 300 via the retainer 232.

The retainer 232 is fixedly (e.g., non-movably) connected to the clip 300 by an anchor 226l, which thereby fixes the respective lower ends 158i, 158ii of the legs 154i, 154ii in relation to the retainer 232 and, thus, the clip 300. More specifically, the anchor 226l extends through the through hole 222 in the retainer 232 and into engagement with a corresponding opening 304 in the clip 300.

As seen in FIG. 3, for example, the anchors 226u, 226l are (generally) positioned in vertical registration (alignment). Although the anchors 226u, 226l are (generally) illustrated as a tab 234 and a fastener 236 (e.g., a screw 238), the anchors 226u, 226l may be configured in any manner suitable for the intended purposes of fixing the upper ends 158iii, 158iv of the legs 154iii, 154iv in relation to the upper support 148 and fixing the lower ends 156i, 156ii of the legs 154i, 154ii in relation to the clip 300, respectively. For example, in certain embodiments, the anchor 226u may also be configured as the aforementioned fastener 236 such that the anchor 226 is extendable into engagement with the retainer 210 via an opening 240 (FIG. 3A) in the upper wall 106.

Figure 11A:
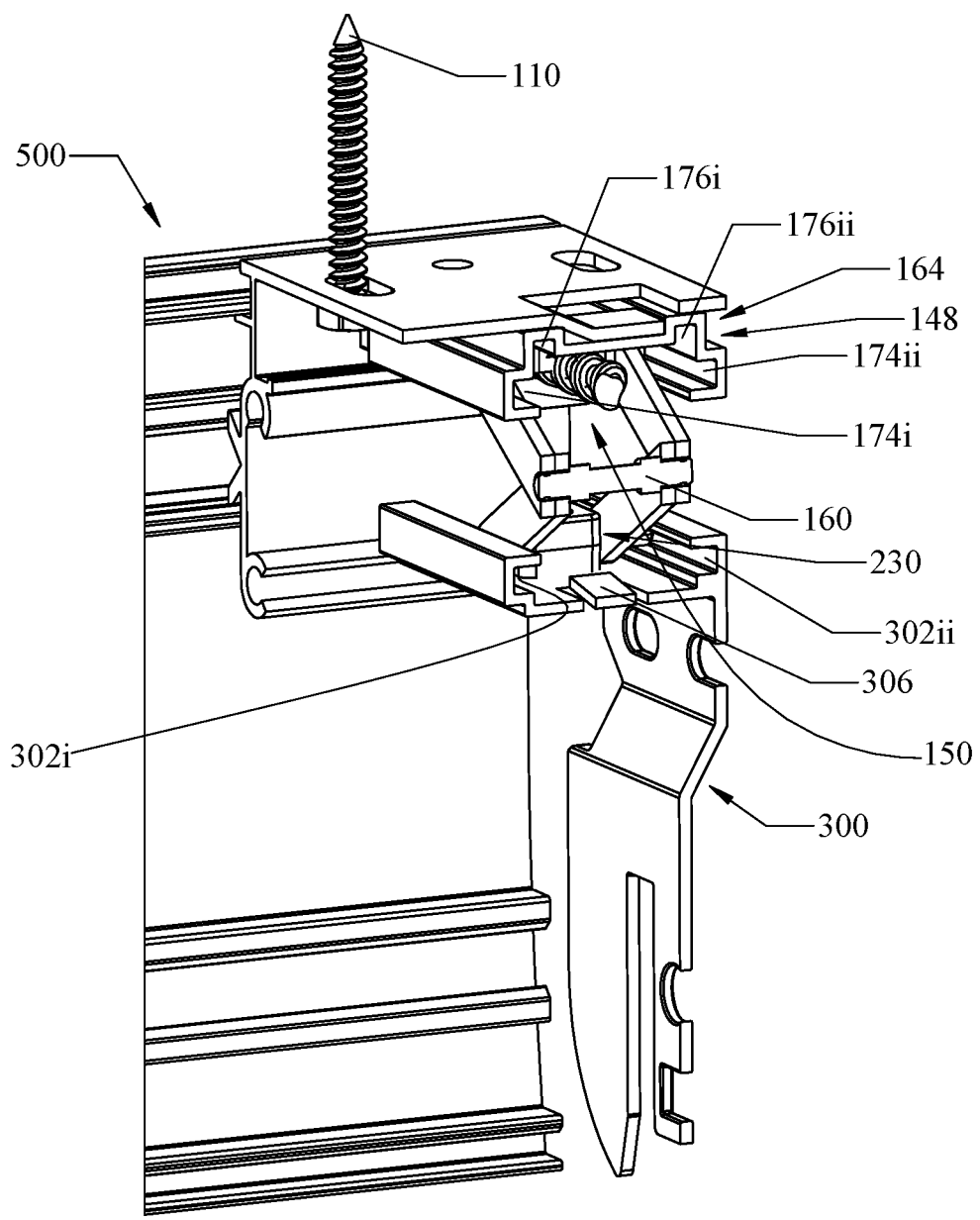
FIG. 11A is a partial, rear, vertical, cross-sectional view of the bracket and the clip shown installed on a mounting surface.
Figure 11B:
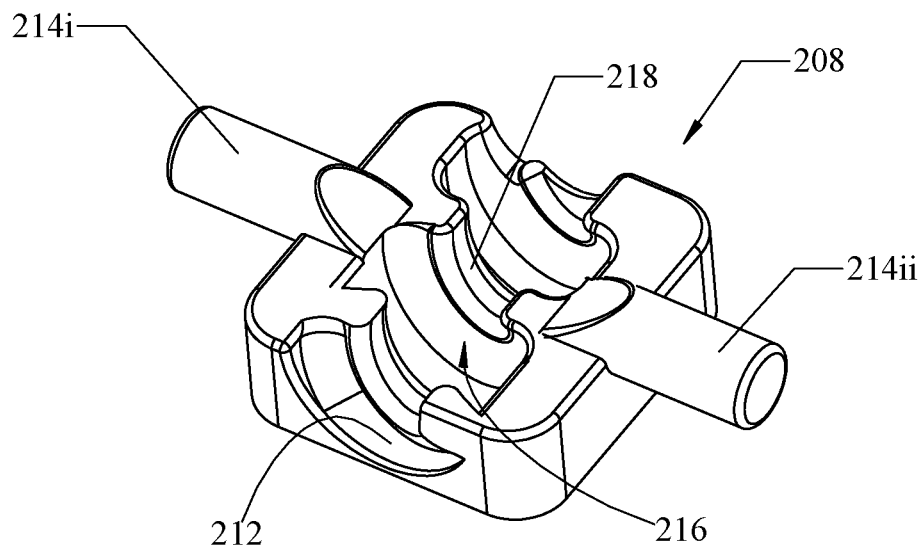
FIG. 11B is a bottom, plan view of a retainer configured for engagement with a drive member of the adjustment mechanism.
Figure 11C:
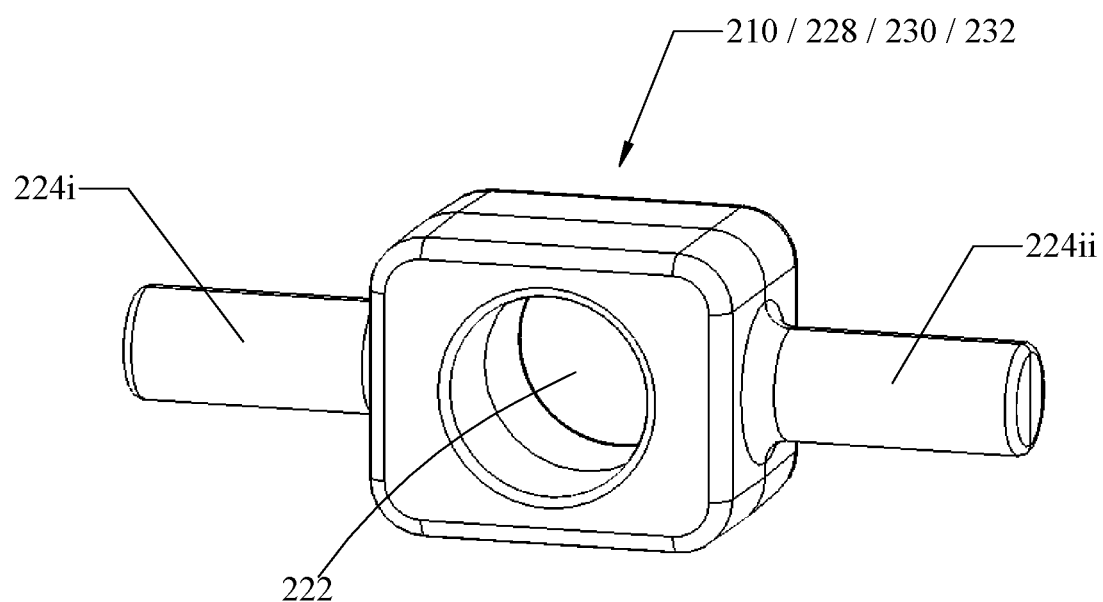
FIG. 11C is a side, plan view of a retainer configured to support the drive member of the adjustment mechanism.
Figure 11E:
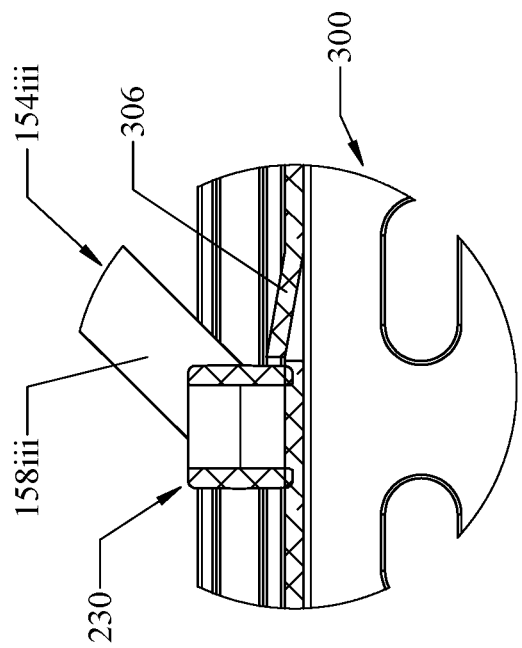
FIG. 11E is an enlargement of the area of detail identified in FIG. 11D.
Figure 11D:
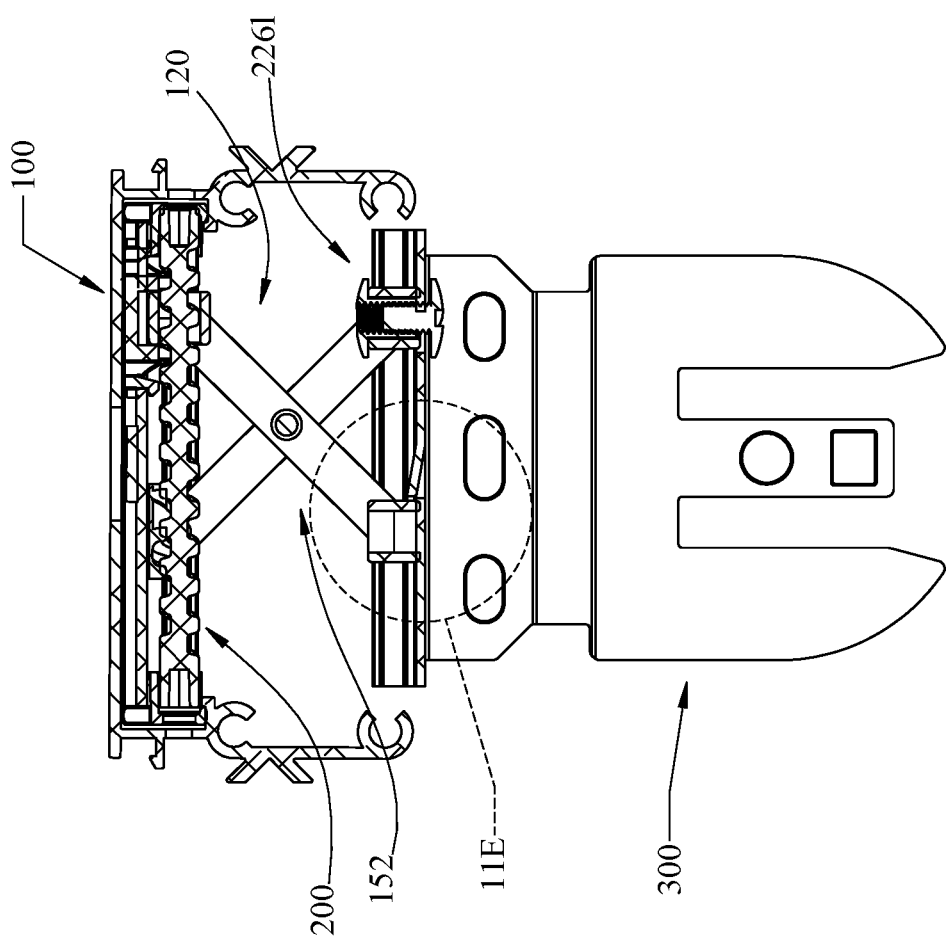
FIG. 11D is a vertical, end, cross-sectional view of the bracket and the clip.
Figure 11G:
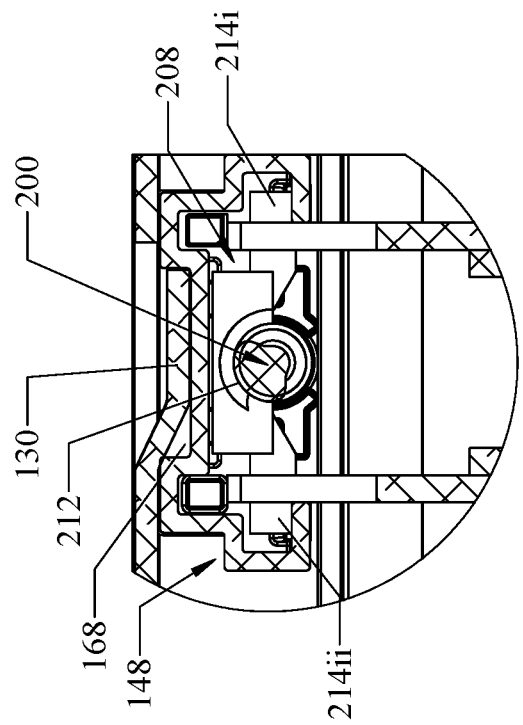
FIG. 11G is an enlargement of the area of detail identified in FIG. 11F.
Figure 11F:
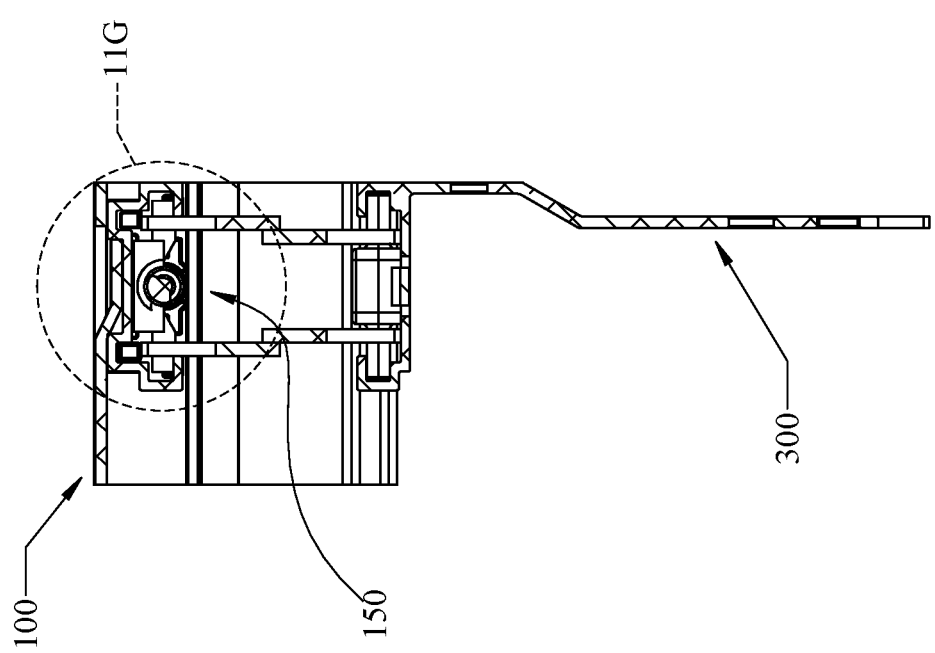
FIG. 11F is a vertical, side, cross-sectional view of the bracket and the clip.
Figure 11I:
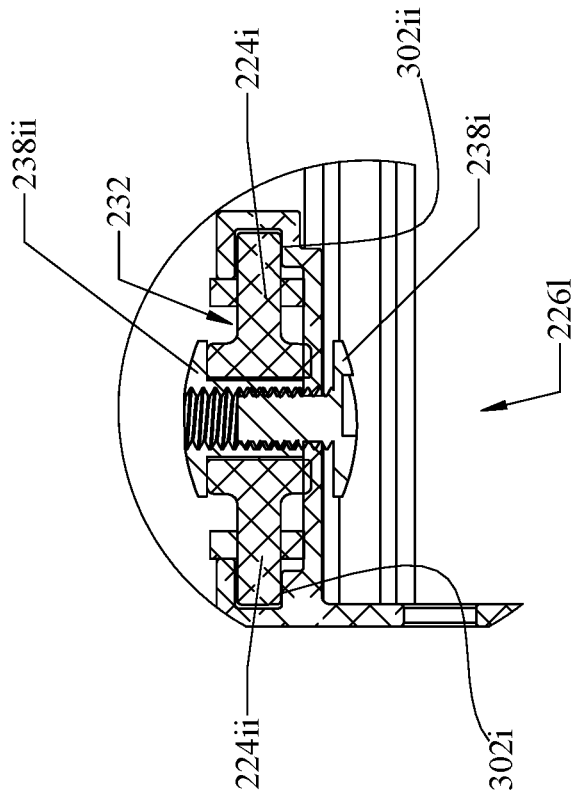
FIG. 11I is an enlargement of the area of detail identified in FIG. 11H.
Figure 11H:
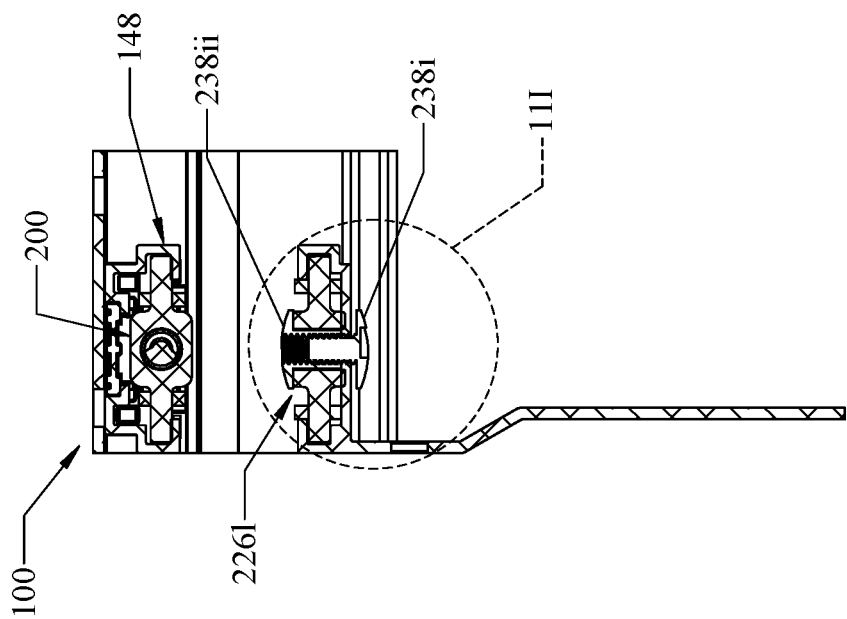
FIG. 11H is a vertical, side, cross-sectional view of the bracket and the clip illustrating connection of the clip to the adjustment mechanism via an anchor.

As seen in FIG. 11A, the clip 300 includes a stop 306 that is configured for contact with the retainer 230 to limit movement of the retainer 230. Limiting movement of the retainer 230 consequently limits movement of the respective lower ends 158iii, 158iv of the legs 154iii, 154iv and, thus, the maximum permitted height adjustment. By varying the specific location of the stop 306, the maximum permitted height adjustment can be varied as necessary or desired.

With reference now to FIGS. 12-21 as well, various installations of the bracket 100, and, thus, the covering 400, will be discussed.

Figure 13:
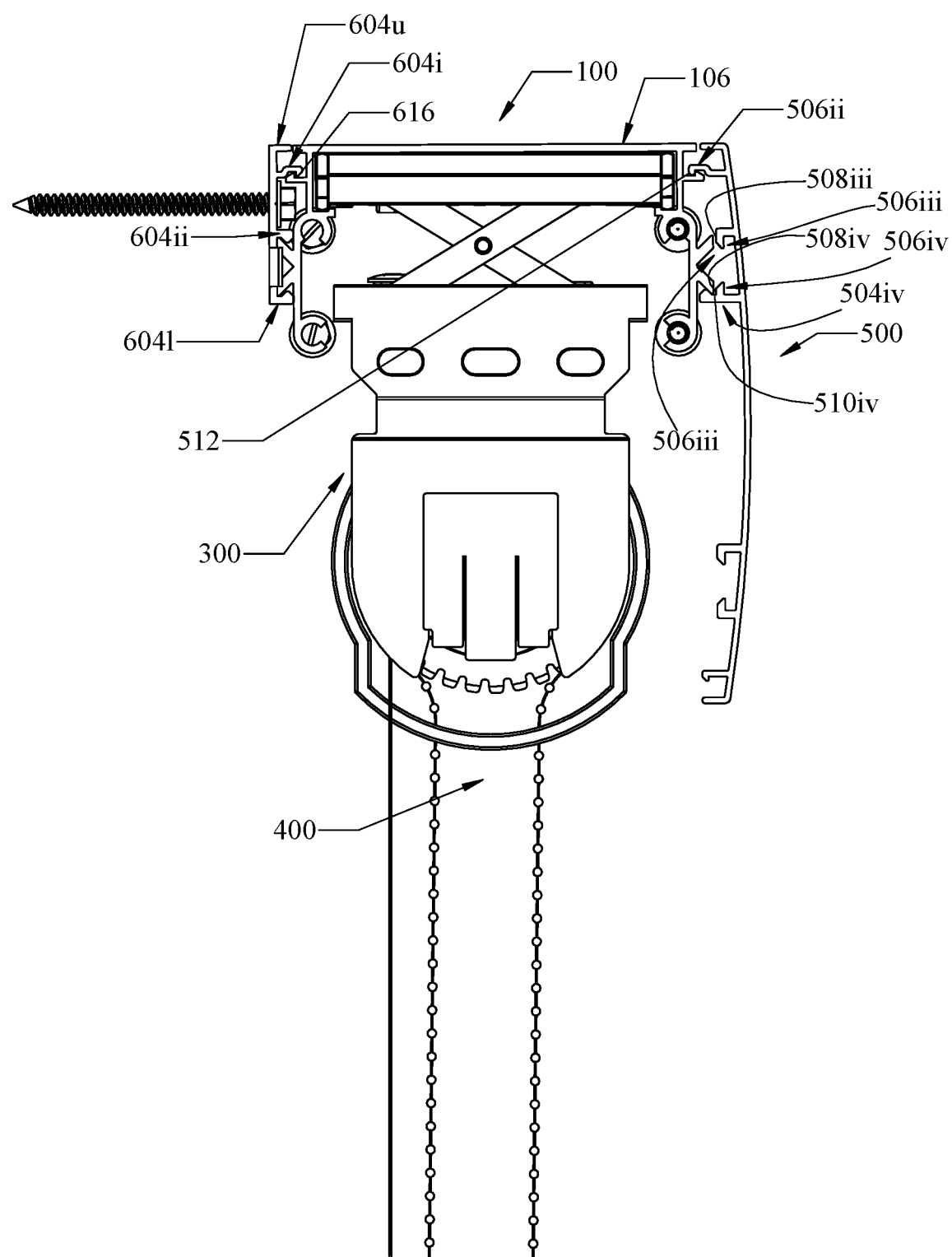
FIG. 13 is a side, plan view of the bracket, the clip, the covering, and the decorative element upon completion of the face-mounted installation.

FIGS. 12 and 13 illustrate a face-mounted installation, in which a pair of the brackets 100 (e.g., first and second brackets 100) are secured to (or adjacent to) an outer (end) face So of the mounting surface S (e.g., on opposite sides of the window W, the door, etc., to be covered) such that the brackets 100 extend from the outer face So in (generally) orthogonal relation thereto. Although described in connection with a window W throughout the following discussion, it should be appreciated that the principles of the installations described below also find applicability to other mounting surfaces S (e.g., doors, etc.).

Initially, one or more support members 600 (e.g., clasps 602) are secured to the outer face So (e.g., in correspondence with the ends of the covering 400), each of which includes: an uppermost shoulder 604u (FIG. 12); a (first) intermediate shoulder 604i located beneath the uppermost shoulder 604u and defining a (downward-facing) channel 606i (FIG. 5); a (second) intermediate shoulder 604ii located beneath the intermediate shoulder 604i and defining a (downward-facing) channel 606ii; and a lowermost shoulder 604l located beneath the intermediate shoulder 604ii and defining an (upward-facing) channel 606l; and a stop 608 that is configured for contact with the engagement members 136 (e.g. the struts 140u, 140l). In certain embodiments, such as that seen in FIGS. 12 and 13, it is envisioned that the support member(s) 600 may be secured to the outer face So via one or more fasteners 610, which may be inserted through one or more corresponding through holes 612 in each support member 600. In such embodiments, it is envisioned that the shoulders 604i, 604ii may define a slot 614i there between that is configured to accommodate the fastener(s) 510 (e.g., head portions thereof). It should be appreciated, however, that the support member(s) 600 may be secured to the outer face So in any suitable manner, such as, for example, via a (releasable) adhesive.

After securement of the support members 600, a bracket 100 is connected to each of the support members 600 and, thus, to the mounting surface S via the mounting structures 144. More specifically, one of the arms 114 is positioned such that the tooth 116 is received by the channel 606ii defined by the intermediate shoulder 604ii, and the engagement member 136 is positioned such that ends of the upper and lower struts 140u, 140l are received by the channels 606ii, 606l defined by the shoulders 604ii, 604l, respectively, such that the engagement member 136 is positioned within a slot 614ii defined between the shoulders 604ii, 604l. During (and after) connection of the bracket 100 to the support member 600, the stop 608 may contact the engagement member 136 (e.g., the struts 140u, 140l) to inhibit (if not entirely prevent) the bracket 100 from sliding entirely through the support member, 600, thereby guarding against inadvertent disconnection of the bracket 100 and the support member 600.

Figure 6:
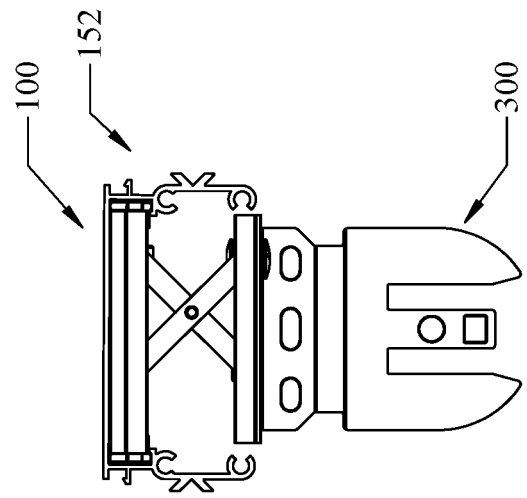
FIG. 6 is a front, plan view of the bracket and the clip shown in a collapsed configuration in which the clip is positioned in an uppermost vertical position.

To facilitate contact between the arm 114 and the shoulder 604ii, it is envisioned that the tooth 116 on each of the arms 114 and the shoulder 604i may include corresponding arcuate or beveled surfaces 242 (FIG. 4), 616 (FIG. 13), respectively, such that the arm 114 is forced beneath the shoulder 604i upon the application of force to the brackets 100. When so positioned, as seen in FIG. 6, the upper wall 106 of the bracket 100 may be positioned adjacent to (or in contact with) the uppermost shoulder 604u to reduce (if not entirely eliminate) spacing between the upper wall 106 and the support member 600 (e.g., to reduce (if not entirely prevent) relative movement between the brackets 100 and the support members 600.

As mentioned above, it is envisioned that the brackets 100 may include (e.g., may be formed partially or entirely from) resiliently deflectable material(s), which will allow the brackets 100 to flex and/or bend during connection to the support members 600, and thereby create an interference fit with the support members 600. It is also envisioned that the brackets 100 may snap into place (relative to the support members 600) to create an audible indication that the brackets 100 have been properly connected to the support members 600.

Either prior or subsequent to connection of the brackets 100 and the support members 600, a pair of clips 300 (e.g., first and second clips 300), which are supported on opposite sides of the covering 400, are connected to the adjustment mechanism 120 for each bracket 100, and the adjustment mechanism 120 is inserted into the corresponding receipt structure 118. More specifically, the lateral extensions 224i, 224ii on the retainers 230, 232 are inserted into the channels 302i, 302ii defined by the clip 300, respectively, so as to mechanically connect the lower ends 158i-158iv of the legs 154i-154iv to the clip 300. Additionally, the anchor 226l is connected to the retainer 232 to thereby further secure (connect) the clip 300 to the bracket 100 via the leg assembly 152.

Either prior or subsequent to connection of the clips 300 and the brackets 100, the decorative element 500 (e.g., the fascia 502) may be connected to the exposed (visible) outer surfaces (sides) 146 of the brackets 100 (i.e., the outer surfaces (sides) 146 opposite to the support members 600). To facilitate such connection, as seen in FIGS. 12 and 13, the decorative element 500 includes a first (uppermost) prong 504i; a second prong 504ii defining a tooth 506ii; a third prong 504iii defining a tooth 506iii and a contact surface 508iii; and fourth prong 504iv defining: a tooth 506iv; a contact surface 508iv; and a channel 510iv. More specifically, the decorative element 500 is positioned such that: the prong 504i is positioned adjacent to (or in contact with) the upper wall 106 of the bracket 100; the tooth 506ii of the prong 504ii is positioned inwardly of the tooth 116 defined by the arm 114 extending from the bracket 100; the contact surface 142*u* defined by the strut 140*u* is positioned adjacent to (or in contact with) the contact surface 508*iii* defined by the prong 504*iii*; and the end of the strut 140*1* is received by the channel 510*iv* defined by the prong 504*iv* such that the contact surface 142*1* defined by the strut 140*1* is positioned adjacent to (or in contact with) the contact surface 508*iv* defined by the prong 504*iv*. To facilitate contact between the arm 114 and the prong 504*ii*, it is envisioned that the prong 504*ii* may define a beveled surface 512 that is configured in correspondence with the beveled surface 242 (FIG. 4) included on the arm 114 such that the arm 114 is forced beneath the prong 504*ii* upon the application of force to the decorative element 500.

Either prior or subsequent to connection of the decorative element 500 (e.g., the fascia 502) to the brackets 100, each end of the covering 400 can be connected to a corresponding clip 300. The vertical positions of the clips 300 and the covering 400, can then be adjusted as required via the adjustment mechanism 120 and operation of the drive assembly 150. More specifically, the drive assembly 150 is activated (and operated) by rotating the drive member 200 either clockwise or counterclockwise) to vary the vertical position of the clip 300 (e.g., raise or lower the clip 300), and, thus, the covering 400, by increasing or decreasing separation between the respective upper ends 156*i*-156*iv* and lower ends 158*i*-158*iv* of the legs 154*i*-154*iv*. While illustrated as being configured for manual rotation via engagement with the tool T (FIG. 9) in the illustrated embodiment, in certain embodiments of the disclosure, it is envisioned that the drive assembly 150 may include a motor assembly (not shown) that is connected to the drive member 200 (e.g., to allow for automated operation of the drive assembly 150). In such embodiments, it is envisioned that the brackets 100 may be auto-leveling. For example, the brackets 100 may include lasers, sensors, etc. that are in communication with controllers (e.g., electronic circuit boards, processors, etc.) to control the position of the drive members 154 via communication with the motor assembly such that brackets 100 positioned on opposite sides of the covering 400 are automatically leveled (i.e., positioned at the same vertical location) upon installation.

During rotation of the drive member 200, whereas the respective upper ends 156*iii*, 156*iv* of the legs 154*iii*, 154*iv* remain fixed in relation to the upper support 148 via engagement between the retainer 208 and the anchor 226*u*, the respective upper ends 156*i*, 156*ii* of the legs 154*i*, 154*ii* are allowed to translate axially (move) in relation to the respective upper ends 156*iii*, 156*iv* of the legs 154*iii*, 154*iv* and the upper support 148. More specifically, as the drive member 200 rotates, the projection 216 (FIG. 11B) moves through the helical thread 206 (FIG. 10), which causes axial translation (movement) of the retainer 208 along the length Lb the bracket 100 and the longitudinal axis X of the drive member 200. Due to the mechanical connection established by insertion of the lateral extensions 214*i*, 214*ii* through the openings 220 in the respective upper ends 156*i*, 156*ii* of the legs 154*i*, 154*ii*, axial translation of the retainer 208 causes corresponding axial translation of the respective upper ends 156*i*, 156*ii* of the legs 154*i*, 154*ii*. By virtue of the pivotable connection between the legs 154*i*-154*iv* established by the pivot member 160 and the fixed connection between the respective lower ends 158*i*, 158*ii* of the legs 154*i*, 154*ii* and the clip 300 established by the anchor 226*l*, axial translation of the respective upper ends 156*i*, 156*ii* of the legs 154*i*, 154*ii* causes reconfiguration of the leg assembly 152 as the leg assembly 152 pivots. More specifically, as the respective upper ends 156*i*, 156*ii* of the legs 154*i*, 154*ii* translate axially, so too do the respective lower ends 158*iii*, 158*iv* of the legs 154*iii*, 154*iv*, which is facilitated by the retainer 230 as the lateral extensions 224*i*, 224*ii* move through the channels 302*i*, 302*ii* defined by the clip 300.

Figure 7:
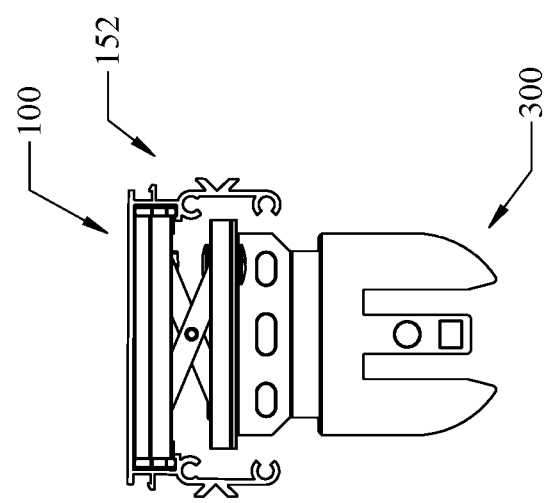
FIG. 7 is a front, plan view of the bracket and the clip shown in an intermediate configuration in which the clip is positioned in an intermediate vertical position.
Figure 8:
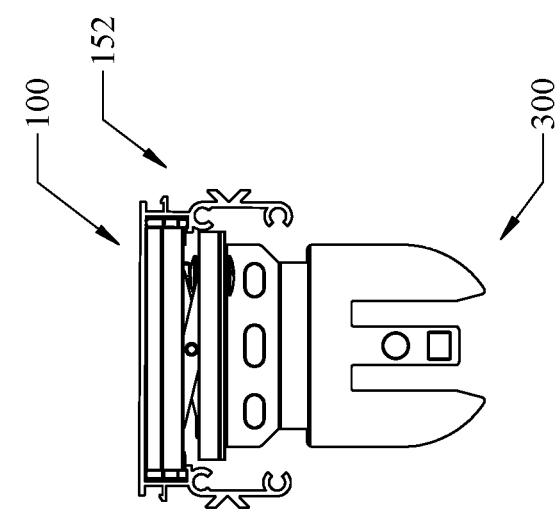
FIG. 8 is a front, plan view of the bracket and the clip shown in an expanded configuration in which the clip is positioned in a lowermost vertical position.
Figure 9:
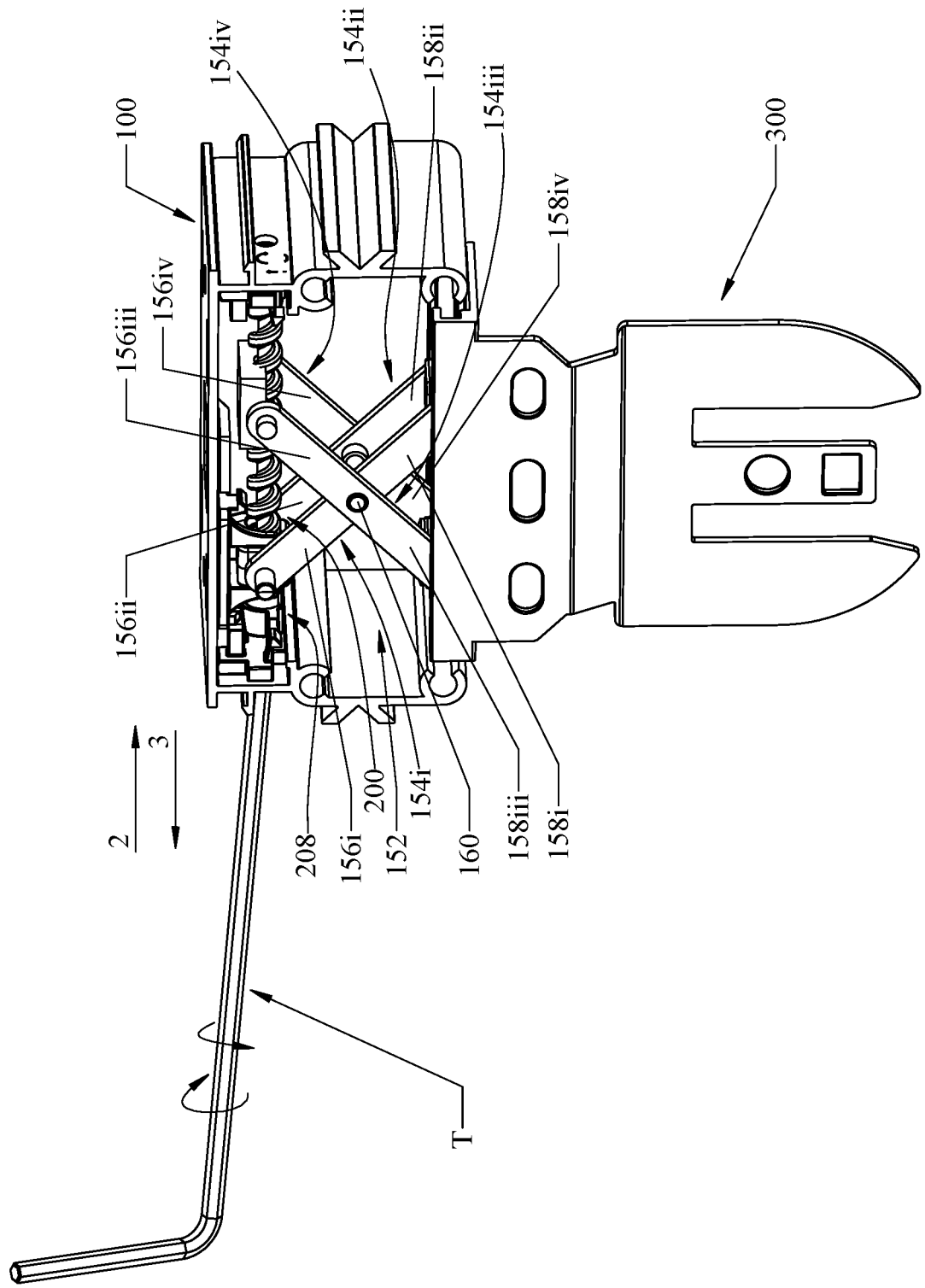
FIG. 9 is a partial, rear, perspective view of the bracket and the clip illustrating manual operation of the adjustment mechanism.
Figure 10:
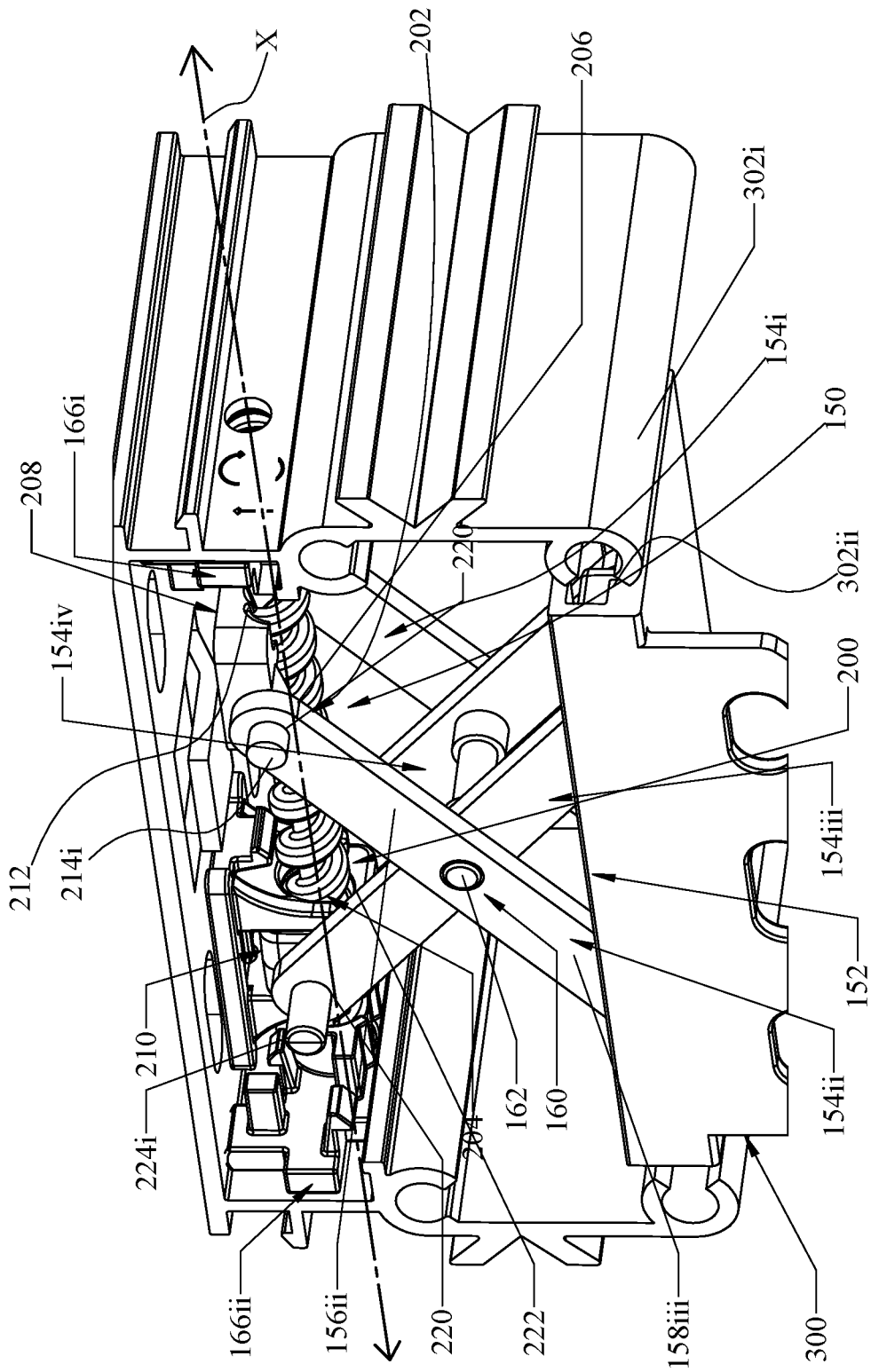
FIG. 10 is a partial, rear, perspective view of the bracket and the clip.

As can be appreciated through reference to FIGS. 6-8, as the leg assembly 152 reconfigures and pivots during rotation of the drive member 200, the vertical position of the clip 300 is adjusted. More specifically, rotation of the drive member 200 in a first direction (e.g., clockwise) will result in movement of the retainer 208 and the respective upper ends 156*i*-156*ii* of the legs 154*i*-154*ii* in a first direction, which is identified by arrow 2 in FIG. 9, to thereby increase the vertical position of the clip 300 in relation to the mounting surface S and, thus, elevate (raise) the covering 400. By contrast, rotation of the drive member 200 in a second direction (e.g., counterclockwise) will result in movement of the retainer 208 and the respective 156*i*-156*ii* of the legs 154*i*-154*ii* in a second direction, which is identified by arrow 3 in FIG. 9, to thereby reduce the vertical position of the clip 300 in relation to the mounting surface S and, thus, lower the covering 400.

Figure 14:
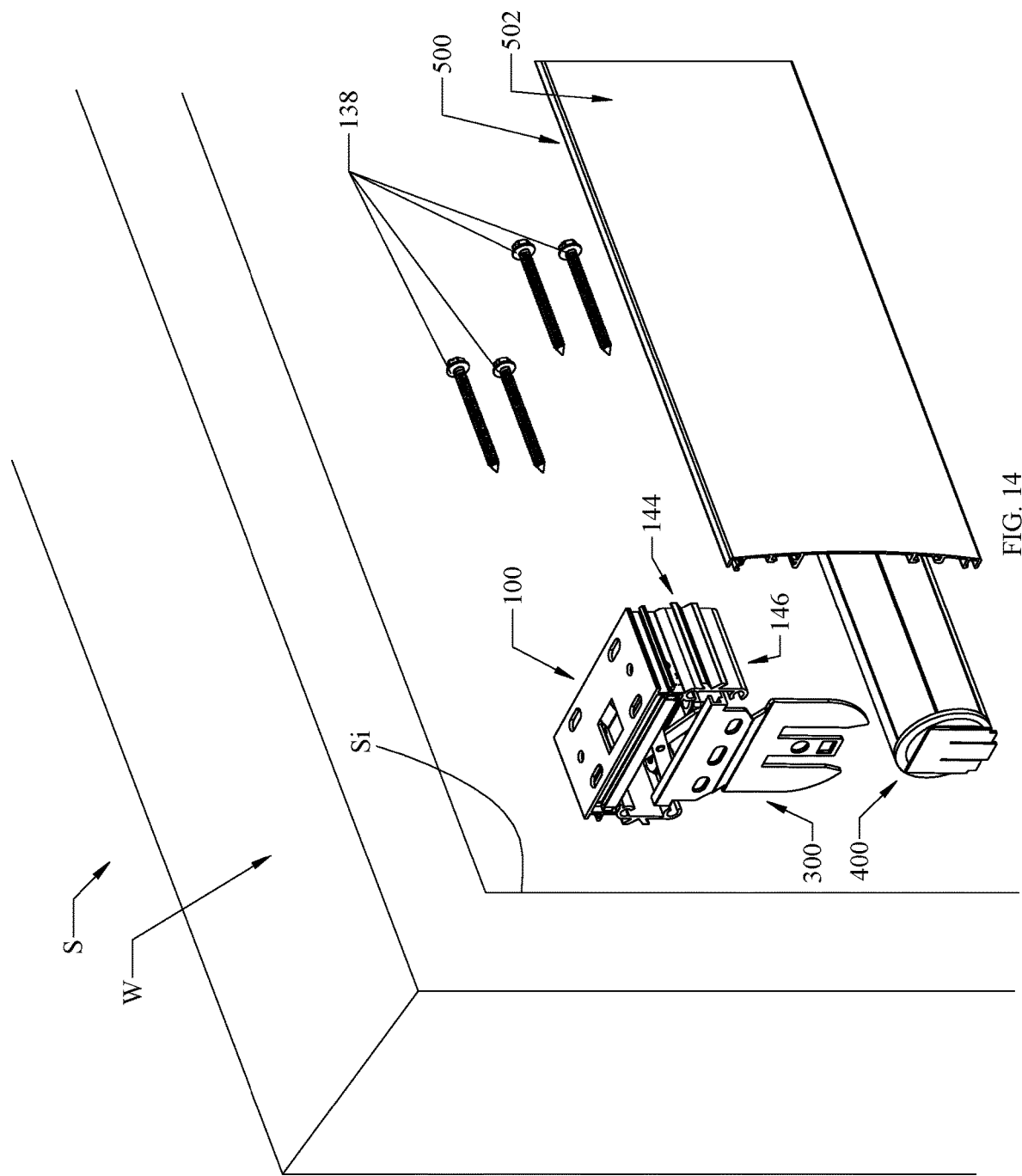
FIG. 14 is a side, perspective view illustrating an inside, side-mounted installation of the bracket, the clip, the covering, and the decorative element to the mounting surface.
Figure 15:
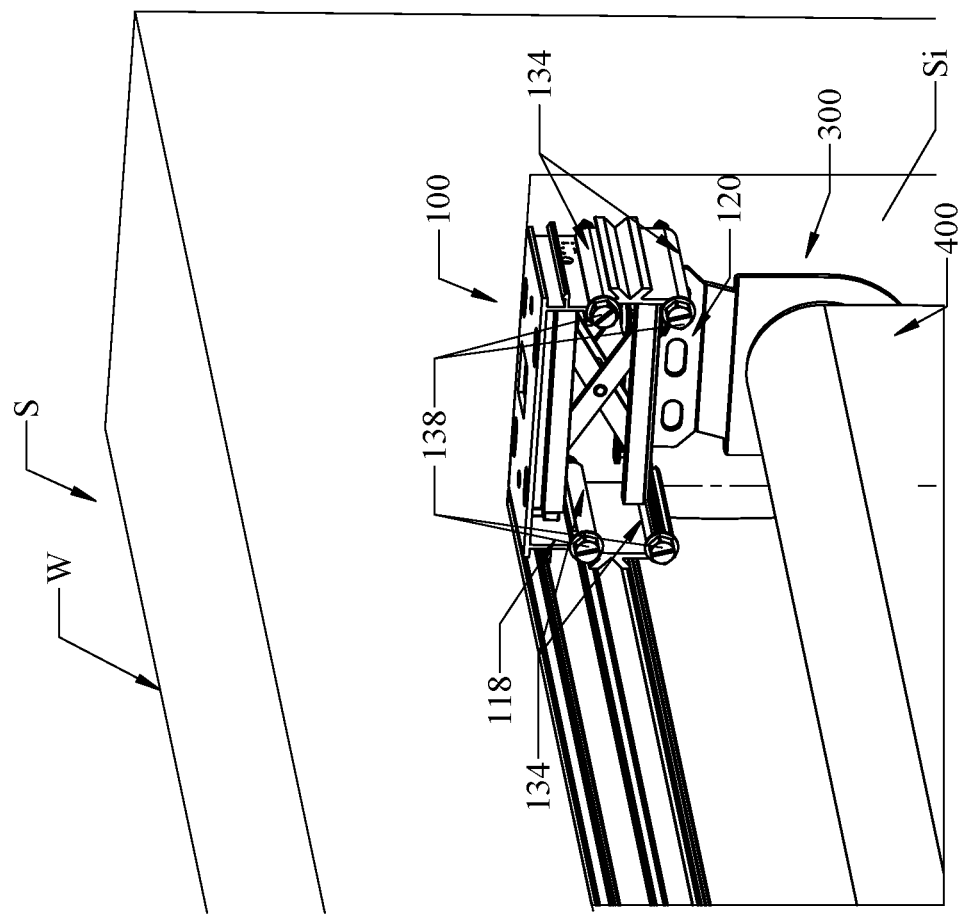
FIG. 15 is a side, perspective view of the bracket, the clip, the covering, and the decorative element upon completion of the inside, side-mounted installation.
Figure 16:
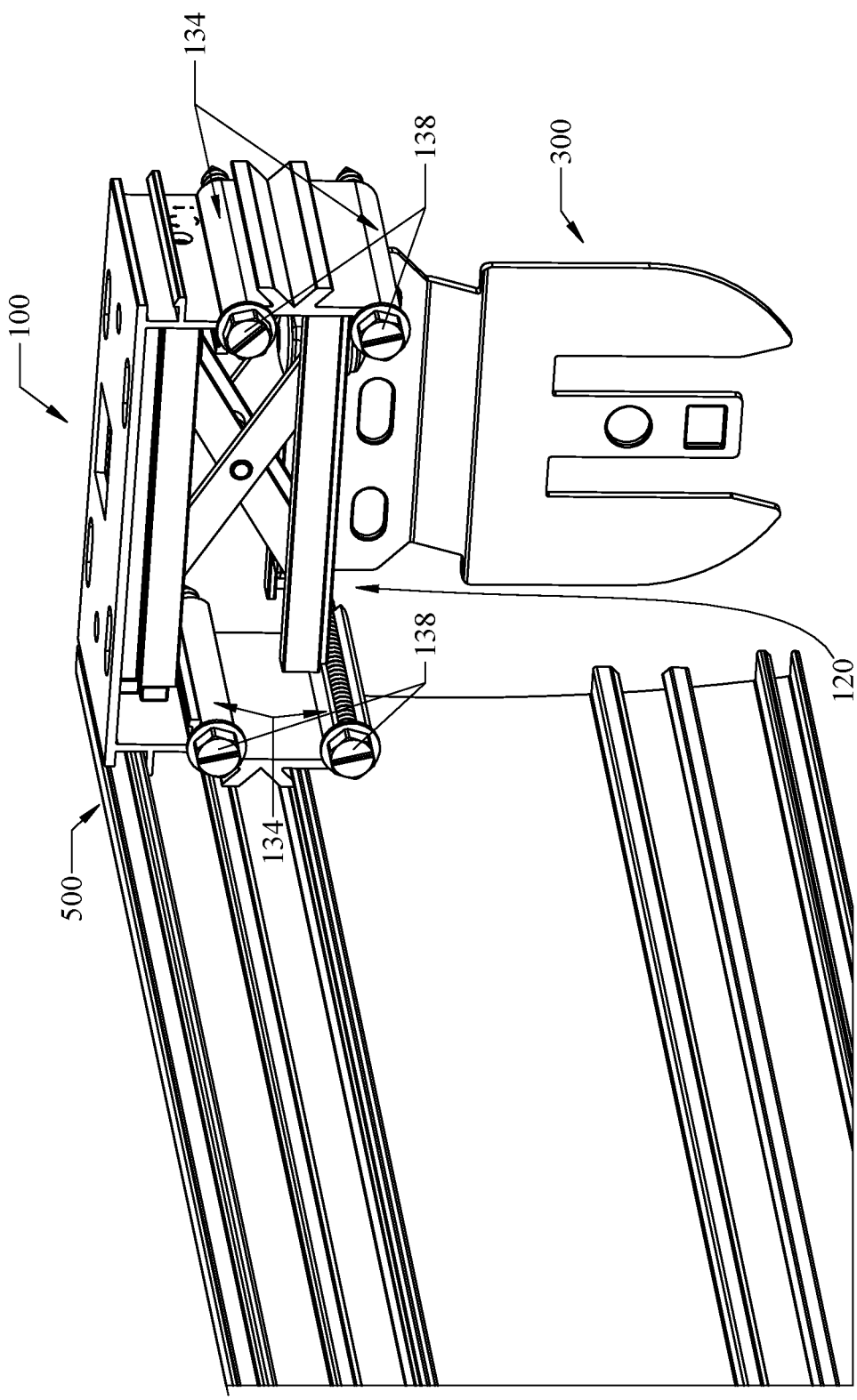
FIG. 16 is a side, perspective view of the bracket, the clip, and the decorative element upon completion of the inside, side-mounted installation.
Figure 17:
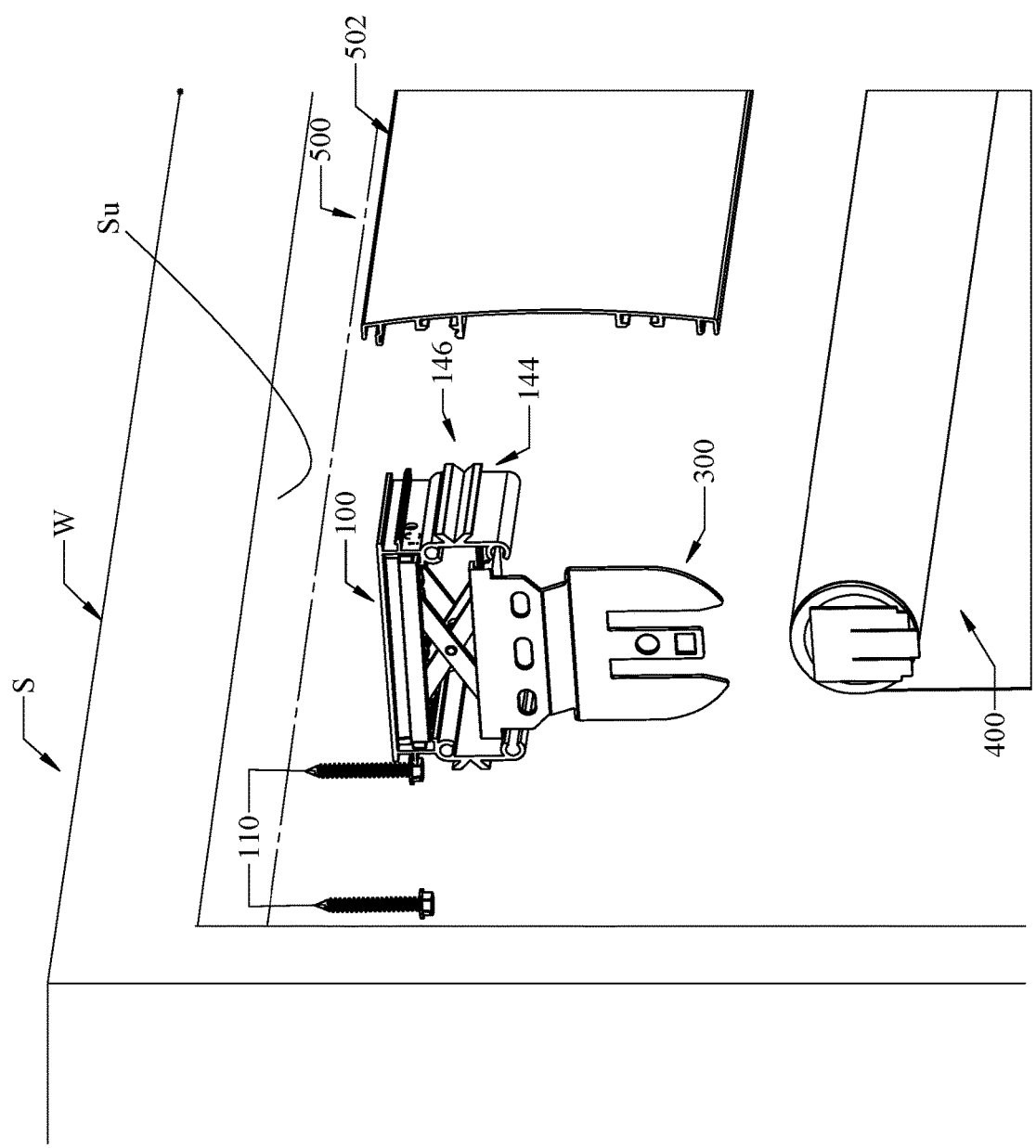
FIG. 17 is a side, perspective view illustrating an inside, top-mounted installation of the bracket, the clip, the covering, and the decorative element to the mounting surface.
Figure 18:
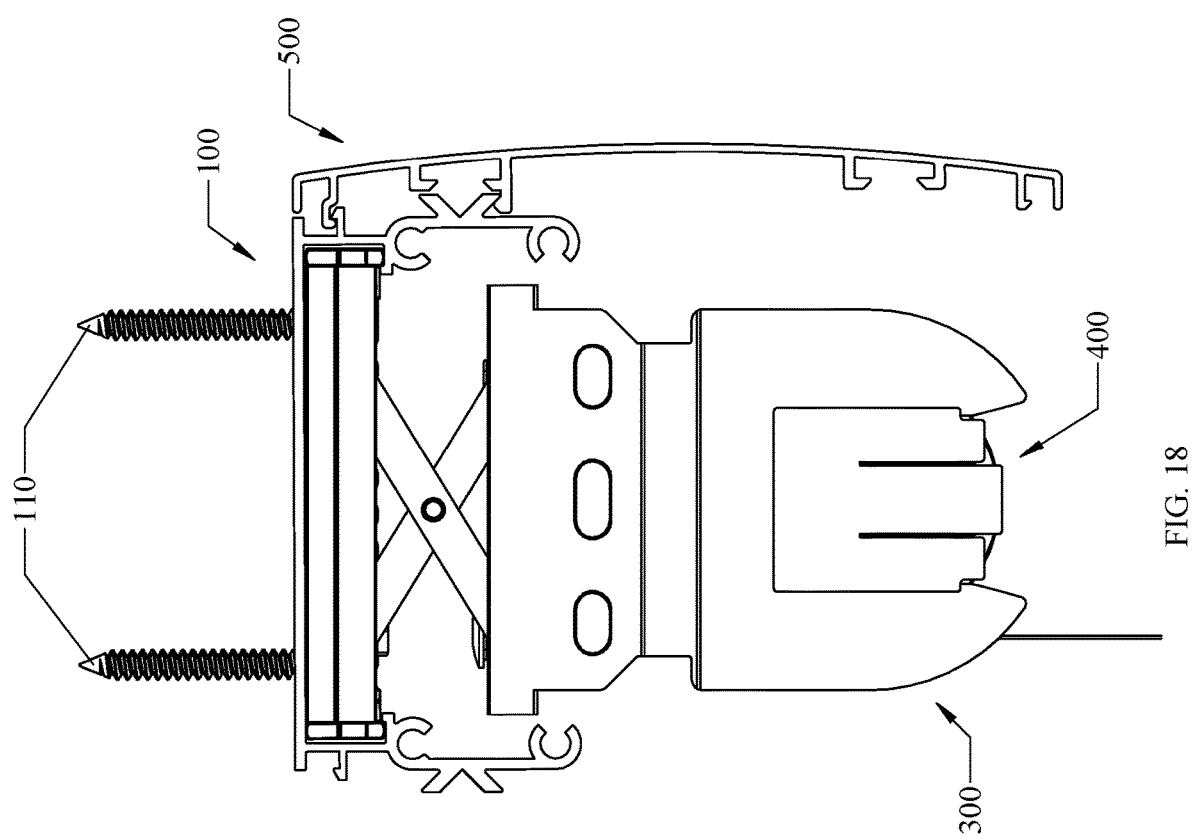
FIG. 18 is a side, plan view of the bracket, the clip, the covering, and the decorative element upon completion of the inside, top-mounted installation.
Figure 19:
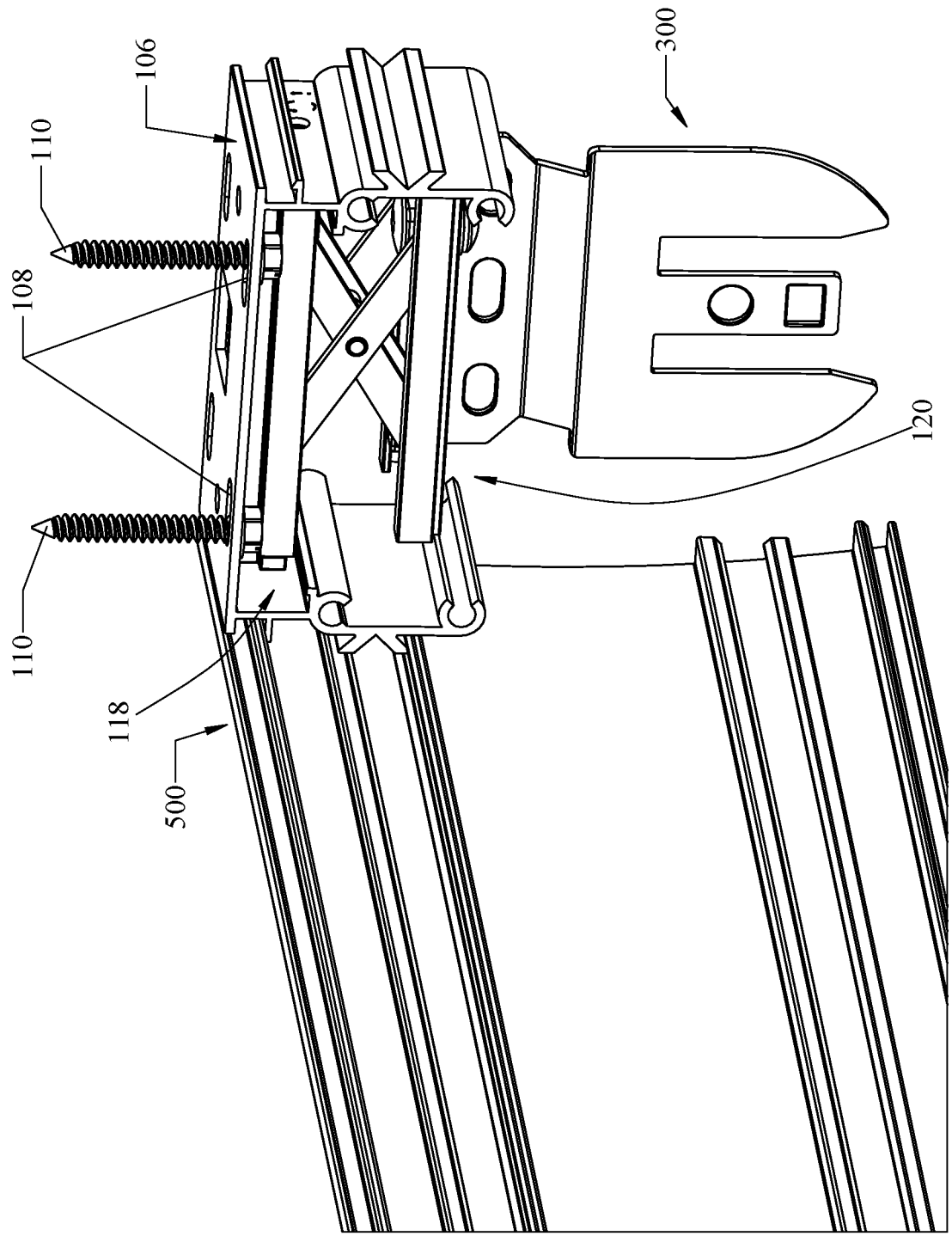
FIG. 19 is a partial, rear, view of the bracket, the clip, and the decorative element shown installed on the mounting surface.
Figure 20:
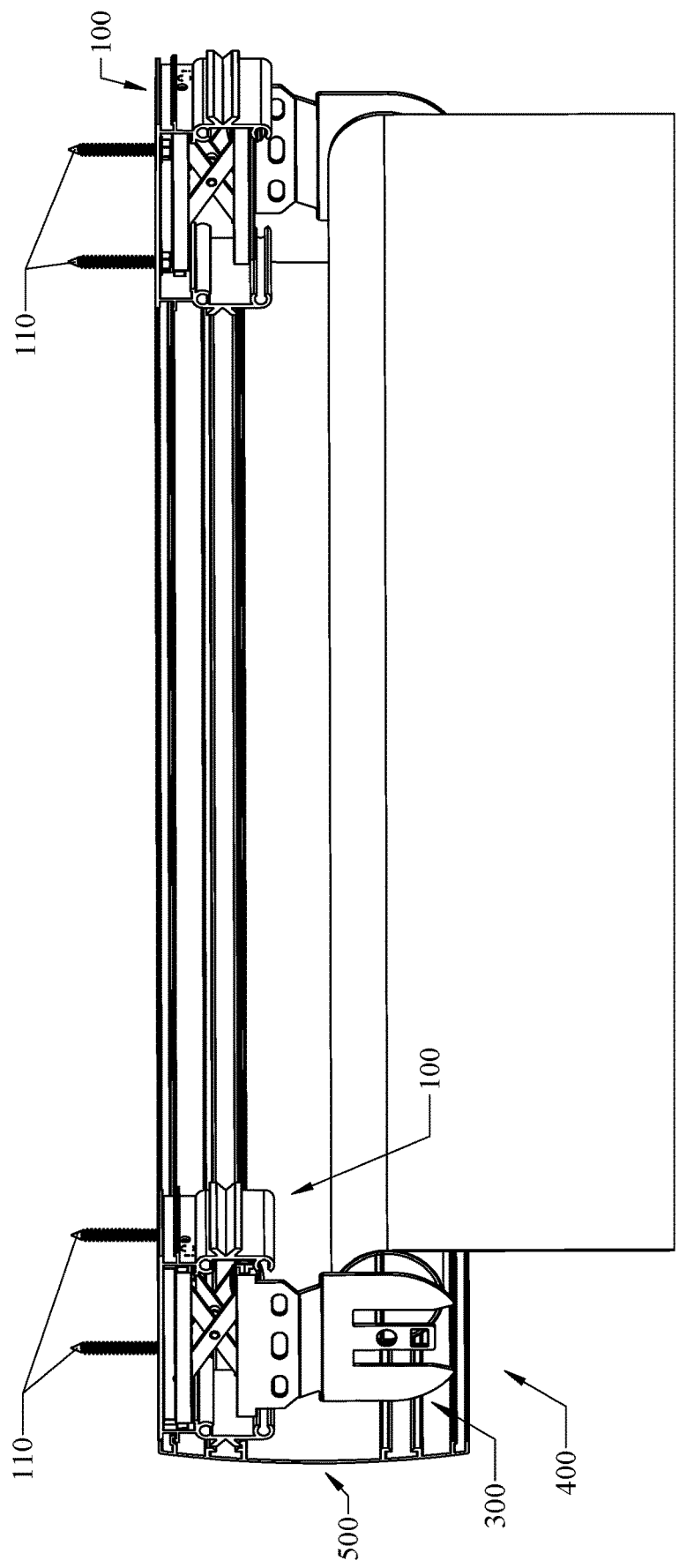
FIG. 20 is a side, perspective view of the bracket, the clip, the covering, and the decorative element upon installation.
Figure 21:
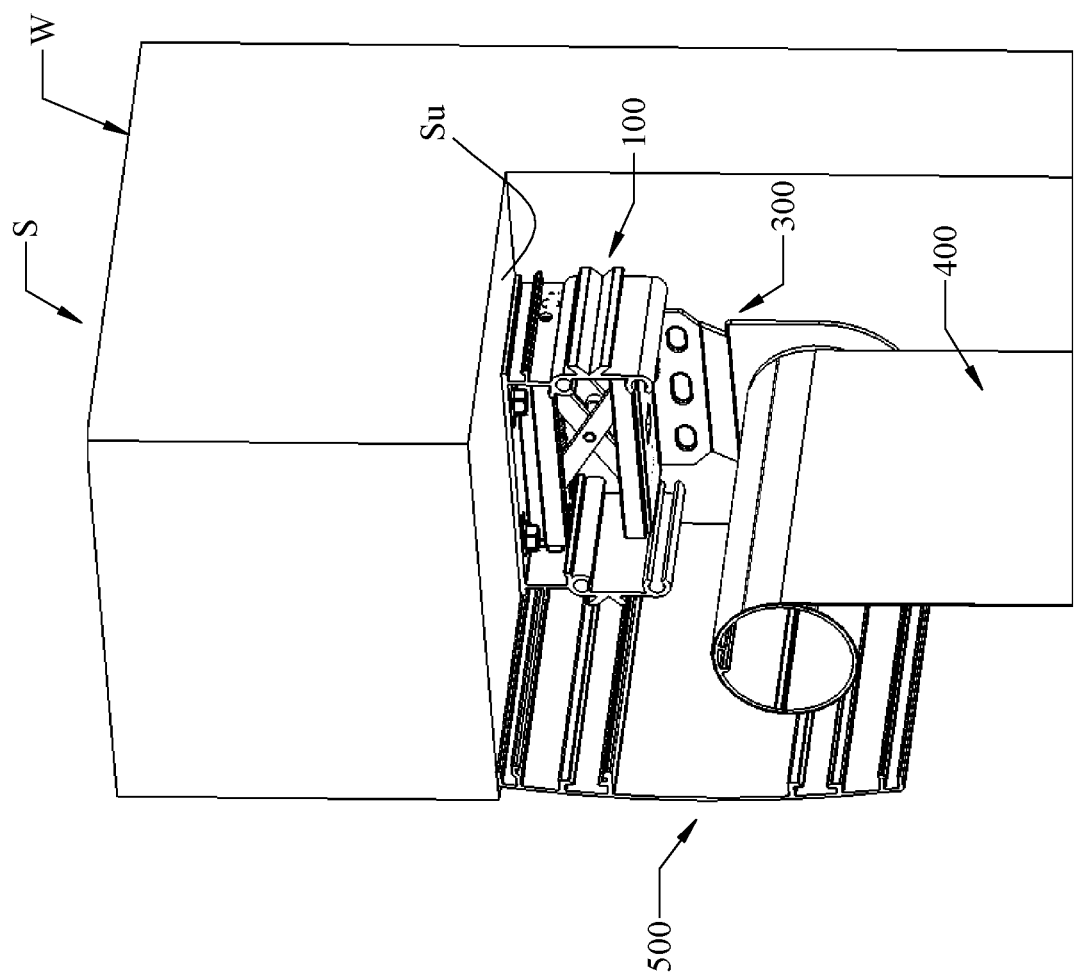
FIG. 21 is a partial, side, perspective view of the bracket, the clip, the covering, and the decorative element upon installation.

FIGS. 14-16 illustrate an inside, side-mounted installation, in which the brackets 100 are secured to (or adjacent to) inner (side) faces Si of the mounting surface S (e.g., on an inner frame or jambs of the window W) such that the brackets 100 extend in (generally) transverse (e.g., orthogonal) relation to the mounting surface S.

Initially, the brackets 100 are connected to the faces Si by inserting the fasteners 138 through the receptacles 134. Thereafter, the clips 300 may be connected to the adjustment mechanism 120, and the adjustment mechanism 120 may be inserted into the corresponding receipt structure 118 in the manner discussed above. The covering 400 can then be connected to the clips 300, and the height of the covering 400 may be varied as desired via operation of the adjustment mechanism 120 (e.g., to level the covering 400, to conceal, obscure, or otherwise eliminate gapping around the window W, etc.).

Either prior or subsequent to connection of the clips 300 to the brackets 100, the decorative element 500 (e.g., the fascia 502) may be connected to one or more of the outer surfaces (sides) 146 of the bracket 100 via the respective mounting structures 144 in the manner described above with respect to the face-mounted installation illustrated in FIGS. 12 and 13.

With reference now to FIGS. 17-21, an inside, top-mounted installation of the brackets 100 will be discussed, in which the brackets 100 are secured to (or adjacent to) an upper (top) face Su of the mounting surface S (e.g., on an upper frame or jamb of the window W) such that the brackets 100 extend in (generally) transverse (e.g., orthogonal) relation to the mounting surface S.

Initially, the brackets 100 are connected to the upper surface Su by inserting the fasteners 110 through the through holes 108 in the upper wall 106 of the brackets 100. Thereafter, the clips 300 may be connected to the adjustment mechanism 120, and the adjustment mechanism 120 may be inserted into the corresponding receipt structure 118 in the manner discussed above. The covering 400 can then be connected to the clips 300, and the height of the covering 400 may be varied as desired via operation of the adjustment mechanism 120 (e.g., to level the covering 400, to conceal, obscure, or otherwise eliminate gapping around the window W, etc.).

Either prior or subsequent to connection of the clips 300 to the brackets 100, the decorative element 500 (e.g., the fascia 502) may be connected to one or more of the outer surfaces (sides) 146 of the bracket 100 via the respective mounting structures 144 in the manner described above.

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A bracket configured for engagement with a clip for a window or door covering, the bracket comprising:
   a body including a receipt structure; and
   an adjustment mechanism configured for positioning within the receipt structure such that the adjustment mechanism extends between the body and the clip, the adjustment mechanism including:
      an upper support defining a pair of channels extending in generally parallel relation to a length of the bracket;
      a drive member rotatable in relation to the upper support and defining a longitudinal axis;
      a first retainer including lateral extensions extending into the pair of channels, the first retainer being configured to receive the drive member such that rotation of the drive member causes axial translation of the first retainer along the longitudinal axis of the drive member;
      a leg assembly including:
         a first pair of legs including:
            upper ends connected to the first retainer such that the axial translation of the first retainer causes corresponding axial translation of the upper ends of the first pair of legs; and
            lower ends mechanically connected to the clip; and
         a second pair of legs pivotably connected to the first pair of legs, the second pair of legs including:
            upper ends; and
            lower ends mechanically connected to the clip; and
      a second retainer connected to the upper ends of the second pair of legs, the second retainer being fixedly connected to the upper support such that axial translation of the upper ends of the first pair of legs causes the leg assembly to pivot to thereby vary a vertical position of the clip.

2. The bracket of claim 1, wherein the drive member includes a worm gear having a helical thread.

3. The bracket of claim 1, further including a first anchor extending through the upper support and into engagement with the second retainer to fixedly connect the second retainer and the upper ends of the second pair of legs to the upper support.

4. The bracket of claim 3, further comprising:
   a third retainer connected to the lower ends of the first pair of legs; and
   a fourth retainer connected to the lower ends of the second pair of legs, the fourth retainer being configured for movable engagement with the clip.

5. The bracket of claim 4, further including a second anchor extending through the fourth retainer, the second anchor being configured for engagement with the clip to fixedly connect the fourth retainer and the lower ends of the second pair of legs to the clip.

6. A bracket configured for engagement with a clip for a window or door covering, the bracket comprising: a body defining a horizontal length, a width, and a vertical height, wherein the body includes: an upper wall; and sidewalls extending from the upper wall along the vertical height; and an adjustment mechanism configured for engagement with the body and the clip such that the clip is supportable by the body and the adjustment mechanism, the adjustment mechanism including a drive assembly configured for vertical movement along the vertical height to vary a vertical position of the clip, wherein the adjustment mechanism includes: an upper support; and a leg assembly extending between the upper support and the clip;
- wherein the leg assembly includes: a first pair of legs each having an upper end positioned adjacent to the upper support and a lower end positioned adjacent to the clip; and a second pair of legs pivotably connected to the first pair of legs, the second pair of legs each having an upper end positioned adjacent to the upper support and a lower end positioned adjacent to the clip;
- wherein the upper ends of the first pair of legs are movable in relation to the upper support and the upper ends of the second pair of legs are fixed in relation to the upper support;
- wherein the upper ends of the first pair of legs are mechanically connected to the drive assembly such that activation of the drive assembly causes axial translation of the upper ends of the first pair of legs in relation to the upper ends of the second pair of legs to pivot the leg assembly and thereby vary the vertical position of the clip;
- wherein the drive assembly includes: a first retainer configured for engagement with the upper ends of the first pair of legs; and a drive member configured for rotatable engagement with the first retainer such that rotation of the drive member causes axial translation of the first retainer along a longitudinal axis of the drive member.

7. The bracket of claim 6, wherein the first retainer includes lateral extensions configured for insertion into corresponding openings defined by the upper ends of the first pair of legs.

8. The bracket of claim 6, wherein the drive member includes a worm gear having a helical thread.

9. The bracket of claim 6, wherein the drive assembly further includes a second retainer configured for engagement with the upper ends of the second pair of legs.

10. The bracket of claim 9, wherein the second retainer includes lateral extensions configured for insertion into corresponding openings defined by the upper ends of the second pair of legs.

11. The bracket of claim 9, wherein the second retainer includes a through hole configured to receive the drive member such that the drive member is rotatable in relation to the second retainer.

12. The bracket of claim 9, further including an anchor extending through the upper support and into engagement with the second retainer to fixedly connect the second retainer and the upper ends of the second pair of legs to the upper support.

* * * * *